(12) United States Patent  
Johnson et al.

(10) Patent No.: US 9,033,833 B2  
(45) Date of Patent: May 19, 2015

(54) GEAR TRANSMISSION AND DERAILLEUR SYSTEM

(71) Applicant: Paha Designs, LLC, Denver, CO (US)

(72) Inventors: Lee Johnson, Absarokee, MT (US); Benjamin Meager, Bozeman, MT (US)

(73) Assignee: PAHA DESIGNS, LLC, Denver, CO (US)

( * ) Notice: Subject to any disclaimer, the term of this patent is extended or adjusted under 35 U.S.C. 154(b) by 81 days.

(21) Appl. No.: 13/622,725

(22) Filed: Sep. 19, 2012

(65) Prior Publication Data

US 2013/0137541 A1    May 30, 2013

Related U.S. Application Data

(63) Continuation-in-part of application No. 13/360,164, filed on Jan. 27, 2012.

(60) Provisional application No. 61/484,037, filed on May 9, 2011, provisional application No. 61/437,565, filed on Jan. 28, 2011.

(51) Int. Cl.

| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16H 9/06* | (2006.01) |
| *B62M 9/124* | (2010.01) |
| *B62M 9/1242* | (2010.01) |
| *B62M 25/04* | (2006.01) |
| *B62K 23/04* | (2006.01) |
| *B62K 23/06* | (2006.01) |

(52) U.S. Cl.  
CPC ................ *F16H 9/06* (2013.01); *B62M 9/124* (2013.01); *B62M 9/1242* (2013.01); *B62M 25/04* (2013.01); *B62K 23/04* (2013.01); *B62K 23/06* (2013.01)

(58) Field of Classification Search  
CPC ......... F16H 9/06; B62M 25/04; B62M 9/124; B62M 9/1242  
USPC ..................................... 474/80, 82  
See application file for complete search history.

(56) References Cited

U.S. PATENT DOCUMENTS

| | | |
|---|---|---|
| 493,832 A | 3/1893 | Martin |
| 493,873 A | 3/1893 | McFarlane |
| 513,544 A | 1/1894 | Wallace |

(Continued)

FOREIGN PATENT DOCUMENTS

WO    WO 2012/103454    8/2012

OTHER PUBLICATIONS

Extended Search Report for European Patent Application No. 13184967, completed Oct. 31, 2013 6 pages.

(Continued)

*Primary Examiner* — Henry Liu  
(74) *Attorney, Agent, or Firm* — Sheridan Ross P.C.

(57) ABSTRACT

A transmission system for vehicles, including bicycles, is disclosed. The system aligns a chain or other drive means to a center of each of a plurality of provided sprockets, allows for a smaller, lighter and more durable shifter/controller, and reduces various complications associated with cable slack and shifting. A derailleur is provided with linear actuated features to directly translate drive means from one position to another along a desired path.

16 Claims, 22 Drawing Sheets

(56) References Cited

U.S. PATENT DOCUMENTS

| | | | |
|---|---|---|---|
| 3,728,912 A | 4/1973 | Darnell | |
| 3,774,732 A | 11/1973 | Basek | |
| 3,830,521 A | 8/1974 | Gardel et al. | |
| 3,837,234 A | 9/1974 | Chao | |
| 3,850,044 A | 11/1974 | Hagen | |
| 3,899,932 A | 8/1975 | Durham | |
| 3,972,244 A | 8/1976 | Bieser et al. | |
| 3,973,447 A | 8/1976 | Nagano | |
| 3,974,707 A | 8/1976 | Nagano | |
| 3,979,962 A | 9/1976 | Kebsch | |
| 3,994,180 A | 11/1976 | Ackerman | |
| 4,002,080 A | 1/1977 | Huret et al. | |
| 4,027,542 A | 6/1977 | Nagano | |
| 4,030,374 A | 6/1977 | Isobe | |
| 4,030,375 A | 6/1977 | Nagano | |
| 4,041,788 A * | 8/1977 | Nininger, Jr. | 474/80 |
| 4,124,107 A | 11/1978 | Kine | |
| 4,132,119 A | 1/1979 | Nagano et al. | |
| 4,183,255 A | 1/1980 | Leiter | |
| 4,193,324 A | 3/1980 | Marc | |
| 4,194,408 A | 3/1980 | Hedrich | |
| 4,198,874 A | 4/1980 | Nagano et al. | |
| 4,199,997 A | 4/1980 | Isobe | |
| 4,199,998 A | 4/1980 | Isobe | |
| 4,201,094 A | 5/1980 | Rathmell | |
| 4,223,562 A | 9/1980 | Nagano et al. | |
| 4,226,130 A | 10/1980 | Isobe | |
| 4,226,131 A | 10/1980 | Yamasaki | |
| 4,226,132 A | 10/1980 | Nagano et al. | |
| 4,235,118 A | 11/1980 | Huret | |
| 4,237,743 A | 12/1980 | Nagano | |
| 4,241,617 A | 12/1980 | Nagano et al. | |
| 4,245,521 A | 1/1981 | Osborn | |
| RE30,524 E | 2/1981 | Nagano | |
| 4,259,873 A | 4/1981 | Nagano et al. | |
| 4,269,601 A | 5/1981 | Nagano | |
| 4,273,546 A | 6/1981 | Bergles | |
| 4,279,172 A | 7/1981 | Nagano et al. | |
| 4,279,174 A | 7/1981 | Ross | |
| 4,279,605 A | 7/1981 | Egami | |
| 4,283,969 A | 8/1981 | Lapeyre | |
| 4,305,312 A | 12/1981 | Lapeyre | |
| 4,305,712 A | 12/1981 | Nagano | |
| D264,069 S | 4/1982 | Ozaki | |
| 4,330,137 A | 5/1982 | Nagano | |
| D265,817 S | 8/1982 | Hahn | |
| 4,348,198 A | 9/1982 | Shimano | |
| 4,352,503 A | 10/1982 | Cotter | |
| 4,355,706 A | 10/1982 | Pan | |
| 4,362,523 A | 12/1982 | Huret | |
| 4,384,865 A | 5/1983 | Ueno | |
| D269,864 S | 7/1983 | Watanabe | |
| 4,403,977 A | 9/1983 | Bergles | |
| 4,403,978 A | 9/1983 | Huret | |
| 4,406,643 A | 9/1983 | Shimano | |
| 4,410,313 A | 10/1983 | Shimano | |
| 4,416,646 A | 11/1983 | Bergles | |
| 4,424,048 A | 1/1984 | Shimano | |
| 4,425,824 A | 1/1984 | Koch | |
| 4,437,848 A | 3/1984 | Shimano | |
| 4,439,171 A | 3/1984 | Bergles | |
| 4,460,347 A | 7/1984 | Bergles | |
| 4,469,479 A | 9/1984 | Ozaki | |
| 4,486,182 A | 12/1984 | Coue | |
| RE31,796 E | 1/1985 | Nagano et al. | |
| 4,493,678 A | 1/1985 | Husted | |
| RE31,854 E | 3/1985 | Egami | |
| 4,515,033 A | 5/1985 | Carlo | |
| 4,519,791 A | 5/1985 | Nagano | |
| 4,530,677 A | 7/1985 | Nagano | |
| 4,551,121 A | 11/1985 | Nagano | |
| 4,566,349 A | 1/1986 | Van der Loon et al. | |
| 4,573,949 A | 3/1986 | Nagano | |
| 4,573,951 A | 3/1986 | Nagano | |
| 4,575,365 A | 3/1986 | Nagano | |
| D283,415 S | 4/1986 | Ishikawa | |
| 4,586,913 A | 5/1986 | Nagano | |
| 4,601,682 A | 7/1986 | Nagano | |
| 4,610,644 A | 9/1986 | Nagano | |
| 4,612,004 A | 9/1986 | Nagano | |
| 4,617,006 A | 10/1986 | Nagano | |
| 4,618,332 A | 10/1986 | Nagano | |
| 4,618,333 A | 10/1986 | Nagano | |
| 4,619,632 A | 10/1986 | Nagano | |
| 4,619,633 A | 10/1986 | Nagano | |
| 4,626,229 A | 12/1986 | Nagano | |
| 4,637,808 A | 1/1987 | Nakamura | |
| 4,637,809 A | 1/1987 | Nagano | |
| 4,642,072 A | 2/1987 | Nagano | |
| 4,644,828 A | 2/1987 | Kozakae | |
| 4,674,995 A | 6/1987 | Iwasaki | |
| D290,831 S | 7/1987 | Juy | |
| 4,684,281 A | 8/1987 | Patterson | |
| 4,690,663 A | 9/1987 | Nagano | |
| 4,692,131 A | 9/1987 | Nagano | |
| 4,693,700 A | 9/1987 | Chappell | |
| D292,503 S | 10/1987 | Juy | |
| 4,701,152 A * | 10/1987 | Dutil et al. | 474/70 |
| 4,713,042 A * | 12/1987 | Imhoff | 474/69 |
| 4,731,045 A | 3/1988 | Nagano | |
| 4,734,083 A | 3/1988 | Nagano | |
| 4,734,084 A | 3/1988 | Nagano | |
| 4,744,784 A | 5/1988 | Nagano | |
| 4,755,162 A | 7/1988 | Nagano | |
| 4,756,205 A | 7/1988 | Dickinson | |
| 4,756,704 A | 7/1988 | Nagano | |
| 4,773,662 A | 9/1988 | Phillips | |
| 4,778,436 A | 10/1988 | Nagano | |
| 4,810,235 A | 3/1989 | Husted et al. | |
| 4,824,420 A * | 4/1989 | Romano | 474/78 |
| RE32,924 E | 5/1989 | Nagano | |
| 4,832,662 A | 5/1989 | Nagano | |
| 4,836,046 A | 6/1989 | Chappel | |
| 4,838,837 A | 6/1989 | Testa | |
| 4,840,605 A * | 6/1989 | Testa | 474/80 |
| 4,842,568 A | 6/1989 | Marchigiano | |
| 4,878,884 A | 11/1989 | Romano | |
| 4,887,990 A * | 12/1989 | Bonnard et al. | 474/78 |
| 4,889,521 A | 12/1989 | Nagano | |
| 4,891,036 A | 1/1990 | Stammetti | |
| 4,894,046 A | 1/1990 | Browning | |
| 4,895,553 A | 1/1990 | Nagano | |
| 4,898,047 A | 2/1990 | Cropek | |
| 4,900,291 A | 2/1990 | Patterson | |
| D307,735 S | 5/1990 | Chappell | |
| 4,938,324 A | 7/1990 | Van Dyke | |
| 4,946,425 A * | 8/1990 | Buhlmann | 474/80 |
| 4,954,121 A | 9/1990 | Juy | |
| 4,955,849 A | 9/1990 | Nagano | |
| 4,960,402 A | 10/1990 | Klein et al. | |
| 4,961,720 A | 10/1990 | Juy | |
| 5,002,520 A | 3/1991 | Greenlaw | |
| 5,020,819 A | 6/1991 | D'Aluisio et al. | |
| 5,033,991 A * | 7/1991 | McLaren | 474/78 |
| D318,836 S | 8/1991 | Hsu | |
| 5,037,355 A | 8/1991 | Kobayashi | |
| 5,052,241 A * | 10/1991 | Nagano | 74/502.2 |
| 5,073,151 A | 12/1991 | Nagano | |
| 5,073,152 A | 12/1991 | Browning | |
| 5,078,653 A | 1/1992 | Nagano | |
| 5,085,621 A | 2/1992 | Nagano | |
| 5,087,226 A | 2/1992 | Nagano | |
| 5,094,120 A * | 3/1992 | Tagawa | 74/473.14 |
| 5,102,372 A | 4/1992 | Patterson et al. | |
| 5,104,358 A | 4/1992 | Kobayashi | |
| 5,127,884 A | 7/1992 | Seymour | |
| 5,135,441 A * | 8/1992 | Gelbien | 474/78 |
| 5,136,892 A | 8/1992 | Ochs | |
| 5,140,736 A | 8/1992 | Hsiao | |
| 5,152,720 A | 10/1992 | Browning et al. | |
| 5,162,022 A | 11/1992 | Kobayashi | |
| 5,163,881 A * | 11/1992 | Chattin | 474/78 |
| 5,171,187 A | 12/1992 | Nagano | |
| 5,188,569 A | 2/1993 | Kobayashi | |

(56) References Cited

U.S. PATENT DOCUMENTS

| | | | |
|---|---|---|---|
| 5,192,248 A | 3/1993 | Nagano | |
| 5,192,249 A | 3/1993 | Nagano | |
| 5,192,250 A | 3/1993 | Kobayashi | |
| 5,197,927 A * | 3/1993 | Patterson et al. | 474/80 |
| 5,205,794 A | 4/1993 | Browning | |
| 5,213,549 A | 5/1993 | Blanchard | |
| D339,770 S | 9/1993 | Noami | |
| 5,246,405 A | 9/1993 | Nagano | |
| 5,287,743 A | 2/1994 | Doolittle et al. | |
| 5,295,916 A * | 3/1994 | Chattin | 474/78 |
| 5,302,155 A | 4/1994 | Ishibashi | |
| 5,312,301 A | 5/1994 | Kobayashi | |
| 5,314,366 A | 5/1994 | Palm | |
| 5,316,327 A | 5/1994 | Bell | |
| 5,346,434 A | 9/1994 | Hsu | |
| 5,354,243 A | 10/1994 | Kriek | |
| 5,356,349 A | 10/1994 | Browning | |
| 5,380,253 A | 1/1995 | Iwasaki | |
| 5,389,043 A | 2/1995 | Hsu | |
| 5,397,273 A | 3/1995 | Ando | |
| 5,397,275 A | 3/1995 | McJunkin, Jr. | |
| 5,407,396 A | 4/1995 | Gilbert | |
| 5,413,534 A | 5/1995 | Nagano | |
| 5,421,219 A | 6/1995 | Tagawa et al. | |
| 5,425,678 A | 6/1995 | Richardson | |
| 5,426,997 A | 6/1995 | Brion | |
| 5,438,889 A | 8/1995 | Tagawa | |
| 5,458,543 A | 10/1995 | Kobayashi | |
| 5,460,396 A | 10/1995 | Sutter et al. | |
| 5,464,373 A | 11/1995 | Leng | |
| 5,474,318 A | 12/1995 | Castellano | |
| 5,481,934 A | 1/1996 | Tagawa | |
| 5,494,307 A * | 2/1996 | Anderson | 280/236 |
| 5,496,222 A | 3/1996 | Kojima et al. | |
| 5,498,211 A | 3/1996 | Hsu | |
| 5,514,041 A | 5/1996 | Hsu | |
| 5,518,456 A | 5/1996 | Kojima et al. | |
| 5,522,611 A | 6/1996 | Schmidt et al. | |
| 5,524,501 A * | 6/1996 | Patterson et al. | 74/473.25 |
| 5,533,937 A | 7/1996 | Patterson et al. | |
| 5,553,960 A | 9/1996 | Turer et al. | |
| 5,564,310 A | 10/1996 | Kishimoto | |
| 5,564,316 A | 10/1996 | Larson et al. | |
| 5,571,056 A | 11/1996 | Gilbert | |
| 5,584,213 A | 12/1996 | Larson et al. | |
| 5,588,331 A | 12/1996 | Huang et al. | |
| 5,588,925 A | 12/1996 | Arbeiter et al. | |
| 5,590,564 A | 1/1997 | Kishimoto | |
| 5,597,366 A | 1/1997 | Ozaki | |
| 5,599,244 A | 2/1997 | Ethington | |
| 5,607,367 A * | 3/1997 | Patterson | 474/80 |
| 5,609,064 A | 3/1997 | Abe | |
| 5,617,761 A | 4/1997 | Kawakami | |
| 5,618,241 A * | 4/1997 | Ose | 474/80 |
| 5,620,383 A | 4/1997 | Patterson et al. | |
| 5,620,384 A | 4/1997 | Kojima et al. | |
| 5,624,334 A | 4/1997 | Lumpkin | |
| 5,624,335 A | 4/1997 | Ando | |
| 5,630,338 A | 5/1997 | Patterson et al. | |
| 5,649,877 A * | 7/1997 | Patterson | 474/80 |
| 5,666,859 A | 9/1997 | Arbeiter et al. | |
| 5,667,449 A | 9/1997 | Dalton | |
| 5,669,840 A | 9/1997 | Liao | |
| 5,672,133 A | 9/1997 | Eden | |
| D384,926 S | 10/1997 | Wallace | |
| 5,681,234 A | 10/1997 | Ethington | |
| 5,685,198 A | 11/1997 | Hawkins | |
| 5,688,200 A * | 11/1997 | White | 474/80 |
| 5,701,786 A | 12/1997 | Kawakami | |
| D389,391 S | 1/1998 | Duston | |
| D391,824 S | 3/1998 | Larson | |
| D391,825 S | 3/1998 | Larson | |
| 5,728,018 A | 3/1998 | Terada et al. | |
| 5,732,598 A | 3/1998 | Shoge et al. | |
| 5,733,215 A | 3/1998 | Hsu et al. | |
| 5,738,603 A | 4/1998 | Schmidt et al. | |
| 5,771,754 A | 6/1998 | Smeeth | |
| D396,205 S | 7/1998 | Kojima | |
| D396,396 S | 7/1998 | Larson | |
| 5,779,580 A | 7/1998 | White et al. | |
| 5,779,581 A | 7/1998 | Fujii | |
| 5,787,757 A | 8/1998 | Ozaki | |
| 5,791,195 A | 8/1998 | Campagnolo | |
| 5,797,296 A | 8/1998 | Ozaki | |
| 5,799,541 A | 9/1998 | Arbeiter | |
| 5,799,542 A | 9/1998 | Yamane | |
| 5,806,372 A | 9/1998 | Campagnolo | |
| 5,816,968 A | 10/1998 | Watson | |
| 5,823,058 A | 10/1998 | Arbeiter | |
| 5,836,844 A | 11/1998 | Yoshida | |
| 5,845,537 A | 12/1998 | Campagnolo | |
| 5,846,148 A | 12/1998 | Fujii | |
| 5,857,387 A | 1/1999 | Larson et al. | |
| 5,860,326 A | 1/1999 | Lussier | |
| D406,041 S | 2/1999 | Hsu | |
| 5,865,698 A | 2/1999 | Huang et al. | |
| 5,881,602 A | 3/1999 | Cirami | |
| 5,919,106 A | 7/1999 | Ichida | |
| 5,921,139 A | 7/1999 | Yamane | |
| 5,921,140 A * | 7/1999 | Lemmens | 74/473.28 |
| 5,921,363 A | 7/1999 | Chiang et al. | |
| 5,935,033 A | 8/1999 | Tseng et al. | |
| 5,961,409 A | 10/1999 | Ando | |
| 5,964,123 A | 10/1999 | Arbeiter | |
| 5,971,878 A | 10/1999 | Leng | |
| 6,012,999 A * | 1/2000 | Patterson | 474/80 |
| 6,029,990 A | 2/2000 | Busby | |
| 6,042,132 A | 3/2000 | Suenaga et al. | |
| 6,042,133 A | 3/2000 | Leiter et al. | |
| 6,042,495 A | 3/2000 | Patterson et al. | |
| D424,984 S | 5/2000 | Hanamura | |
| 6,055,882 A | 5/2000 | Arbeiter et al. | |
| 6,067,875 A | 5/2000 | Ritchey et al. | |
| 6,093,122 A | 7/2000 | McLaughlin et al. | |
| RE36,830 E | 8/2000 | Lumpkin | |
| 6,099,425 A | 8/2000 | Kondo | |
| 6,102,821 A | 8/2000 | Nakamura | |
| D432,056 S | 10/2000 | Hanamura | |
| 6,135,904 A | 10/2000 | Guthrie | |
| 6,139,456 A | 10/2000 | Lii et al. | |
| 6,146,297 A | 11/2000 | Kimura | |
| 6,149,541 A | 11/2000 | Nakamura et al. | |
| 6,158,294 A * | 12/2000 | Jung | 74/64 |
| 6,159,118 A | 12/2000 | Campbell | |
| 6,190,275 B1 | 2/2001 | Ciancio et al. | |
| 6,199,447 B1 | 3/2001 | Lump et al. | |
| 6,209,413 B1 | 4/2001 | Chang | |
| 6,213,905 B1 | 4/2001 | White et al. | |
| 6,216,553 B1 | 4/2001 | Wessel et al. | |
| 6,234,927 B1 | 5/2001 | Peng | |
| 6,264,576 B1 | 7/2001 | Lien | |
| D447,986 S | 9/2001 | Hsu | |
| 6,287,228 B1 | 9/2001 | Ichida | |
| 6,290,621 B1 | 9/2001 | Ichida | |
| 6,293,883 B1 | 9/2001 | Ichida | |
| 6,325,733 B1 * | 12/2001 | Patterson et al. | 474/80 |
| 6,340,338 B1 | 1/2002 | Kamada | |
| 6,343,524 B1 | 2/2002 | Lien | |
| 6,350,212 B1 | 2/2002 | Campagnolo | |
| D454,102 S | 3/2002 | Iteya | |
| D454,103 S | 3/2002 | Iteya | |
| 6,354,971 B1 | 3/2002 | Howell et al. | |
| 6,354,973 B1 | 3/2002 | Barnett | |
| 6,368,243 B1 | 4/2002 | Liu | |
| 6,383,111 B1 | 5/2002 | Liu | |
| 6,406,048 B1 | 6/2002 | Castellano | |
| 6,447,413 B1 | 9/2002 | Turer et al. | |
| 6,453,764 B1 | 9/2002 | Ose | |
| 6,454,671 B1 * | 9/2002 | Wickliffe | 474/80 |
| 6,460,673 B2 | 10/2002 | Hsu | |
| 6,467,368 B1 | 10/2002 | Feng et al. | |
| 6,471,610 B1 | 10/2002 | Tseng et al. | |
| 6,484,603 B2 | 11/2002 | Wessel et al. | |
| 6,494,112 B2 | 12/2002 | Chen | |

(56) References Cited

U.S. PATENT DOCUMENTS

| | | |
|---|---|---|
| 6,510,757 B1 | 1/2003 | Wessel |
| 6,513,405 B1 | 2/2003 | Sturmer et al. |
| 6,533,690 B2 | 3/2003 | Barnett |
| 6,537,173 B2 | 3/2003 | Mercat et al. |
| 6,553,861 B2 | 4/2003 | Ose |
| 6,557,679 B1 | 5/2003 | Warner et al. |
| 6,557,684 B1 | 5/2003 | Jager et al. |
| 6,565,466 B2 | 5/2003 | Liu et al. |
| 6,572,500 B2 | 6/2003 | Tetsuka |
| 6,629,903 B1 | 10/2003 | Kondo |
| 6,631,655 B2 | 10/2003 | Blaschke et al. |
| 6,638,190 B2 | 10/2003 | Patterson et al. |
| 6,644,143 B2 | 11/2003 | Feng et al. |
| 6,666,786 B2 | 12/2003 | Yahata |
| 6,692,389 B2 | 2/2004 | Yin |
| 6,694,840 B2 | 2/2004 | Kawakami |
| 6,695,729 B2 | 2/2004 | Ozaki |
| 6,698,307 B2 | 3/2004 | Wesling et al. |
| 6,718,844 B2 | 4/2004 | Hanatani |
| 6,726,586 B2 | 4/2004 | Fukuda |
| 6,726,587 B2 | 4/2004 | Kawakami |
| 6,729,203 B2 | 5/2004 | Wesling et al. |
| 6,755,431 B2 | 6/2004 | Chang |
| 6,761,657 B2 | 7/2004 | Young |
| 6,767,308 B2 | 7/2004 | Kitamura |
| 6,792,825 B2 | 9/2004 | Kawakami |
| 6,829,963 B2 | 12/2004 | Liao |
| 6,837,815 B2 | 1/2005 | Meggiolan |
| 6,843,149 B2 | 1/2005 | Gavillucci |
| 6,848,335 B1 | 2/2005 | Kawakami |
| 6,877,393 B2 | 4/2005 | Takachi |
| 6,902,503 B2 | 6/2005 | Nanko |
| 6,923,740 B2 | 8/2005 | Nanko |
| 6,923,741 B2 | 8/2005 | Wei |
| 6,949,040 B2 | 9/2005 | Ando |
| 6,959,939 B2 | 11/2005 | Fujii et al. |
| 6,962,544 B2 | 11/2005 | Nanko |
| 6,979,009 B2 | 12/2005 | Ichida et al. |
| 6,986,723 B2 | 1/2006 | Valle |
| 6,993,995 B2 | 2/2006 | Fujii |
| 7,004,867 B2 | 2/2006 | Wei |
| 7,011,592 B2 | 3/2006 | Shahana et al. |
| 7,013,751 B2 | 3/2006 | Hilsky et al. |
| 7,025,698 B2 * | 4/2006 | Wickliffe ................... 474/80 |
| 7,044,874 B2 | 5/2006 | Shahana et al. |
| 7,048,660 B2 | 5/2006 | Shahana |
| 7,051,829 B2 | 5/2006 | Wahl |
| 7,059,618 B2 | 6/2006 | Mallard |
| 7,059,983 B2 | 6/2006 | Heim |
| 7,066,857 B1 | 6/2006 | DeRosa |
| 7,081,058 B2 | 7/2006 | Nankou |
| 7,104,154 B2 | 9/2006 | Hilsky et al. |
| 7,104,908 B2 | 9/2006 | Nagano |
| 7,125,354 B2 | 10/2006 | Shahana |
| 7,125,356 B2 | 10/2006 | Todd |
| D531,944 S | 11/2006 | Okada |
| D533,124 S | 12/2006 | Hanamura |
| D534,102 S | 12/2006 | Arakawa |
| D534,103 S | 12/2006 | Arakawa |
| 7,150,205 B2 | 12/2006 | Takachi |
| 7,153,229 B2 | 12/2006 | Matsumoto et al. |
| D534,460 S | 1/2007 | Hanamura |
| 7,156,764 B2 | 1/2007 | Mercat et al. |
| 7,166,048 B2 | 1/2007 | Shahana et al. |
| D536,282 S | 2/2007 | Masui |
| 7,186,194 B2 | 3/2007 | Nankou |
| 7,189,172 B2 | 3/2007 | Shahana et al. |
| 7,189,173 B2 | 3/2007 | Tsai et al. |
| 7,228,756 B2 | 6/2007 | Tsumiyama |
| D546,741 S | 7/2007 | Iteya et al. |
| 7,244,203 B2 | 7/2007 | Sze et al. |
| D548,655 S | 8/2007 | Barrow et al. |
| 7,258,637 B2 | 8/2007 | Thomasberg |
| D551,131 S | 9/2007 | Arakawa |
| 7,267,220 B2 | 9/2007 | Wang |
| 7,285,064 B2 | 10/2007 | Ichida et al. |
| D555,050 S | 11/2007 | Hanamura |
| 7,294,076 B2 | 11/2007 | Matsumoto et al. |
| 7,302,874 B2 | 12/2007 | Chen |
| 7,305,903 B2 | 12/2007 | Kawakami |
| 7,306,531 B2 | 12/2007 | Ichida et al. |
| 7,318,784 B2 | 1/2008 | Onogi et al. |
| 7,320,655 B2 | 1/2008 | Fukuda |
| D561,075 S | 2/2008 | Arakawa |
| D561,076 S | 2/2008 | Arakawa |
| 7,326,137 B2 | 2/2008 | van der Linde |
| D563,295 S | 3/2008 | Mabuchi |
| 7,338,059 B2 | 3/2008 | Sugimoto |
| 7,341,532 B2 | 3/2008 | Ichida et al. |
| 7,347,439 B2 | 3/2008 | Young et al. |
| 7,354,362 B2 | 4/2008 | Dal Pra' |
| 7,361,110 B2 | 4/2008 | Oishi et al. |
| 7,363,873 B2 | 4/2008 | Iteya et al. |
| 7,373,854 B2 | 5/2008 | Chen |
| 7,381,142 B2 | 6/2008 | Campagnolo |
| 7,396,304 B2 | 7/2008 | Shahana |
| 7,401,535 B2 | 7/2008 | Blaschke |
| 7,434,489 B1 | 10/2008 | Scranton |
| 7,437,969 B2 | 10/2008 | Ose |
| 7,438,657 B2 | 10/2008 | Nakai et al. |
| 7,438,658 B2 | 10/2008 | Tetsuka et al. |
| 7,442,136 B2 | 10/2008 | Ichida et al. |
| D579,833 S | 11/2008 | Acenbrak |
| D580,304 S | 11/2008 | Okada |
| D581,321 S | 11/2008 | Pang |
| D582,322 S | 12/2008 | Nguan |
| 7,462,120 B1 | 12/2008 | Thompson |
| 7,484,609 B2 | 2/2009 | Chen |
| 7,497,793 B2 | 3/2009 | Hee |
| 7,503,420 B2 | 3/2009 | Fujii |
| 7,503,863 B2 | 3/2009 | Ichida et al. |
| 7,503,864 B2 | 3/2009 | Nonoshita et al. |
| 7,526,979 B2 | 5/2009 | Tsumiyama |
| 7,527,571 B2 | 5/2009 | Shahana |
| 7,547,021 B2 | 6/2009 | Bon |
| 7,552,935 B2 | 6/2009 | McAndrews |
| 7,565,848 B2 | 7/2009 | Fujii |
| 7,585,240 B2 | 9/2009 | Kamada |
| 7,614,972 B2 | 11/2009 | Oseto |
| 7,628,095 B2 | 12/2009 | Funai |
| 7,650,814 B2 | 1/2010 | Watarai |
| 7,651,424 B2 | 1/2010 | Yamamoto et al. |
| 7,654,925 B2 | 2/2010 | Todd |
| 7,665,382 B2 | 2/2010 | Kawakami |
| 7,665,383 B2 | 2/2010 | Kawakami |
| 7,665,384 B2 | 2/2010 | Sato et al. |
| 7,666,111 B2 | 2/2010 | Shahana et al. |
| 7,674,198 B2 | 3/2010 | Yamaguchi |
| 7,677,998 B2 | 3/2010 | Tetsuka |
| 7,681,472 B2 | 3/2010 | Weiss |
| 7,686,716 B2 | 3/2010 | Matsumoto et al. |
| 7,699,329 B2 | 4/2010 | Wesling et al. |
| 7,703,350 B2 | 4/2010 | Fujii |
| 7,703,785 B2 | 4/2010 | Colegrove et al. |
| 7,704,172 B2 | 4/2010 | Tetsuka et al. |
| 7,704,173 B2 | 4/2010 | Ichida et al. |
| 7,712,566 B2 | 5/2010 | Jordan et al. |
| 7,712,593 B2 | 5/2010 | Goring |
| 7,721,621 B2 | 5/2010 | Kawakami |
| 7,722,487 B2 | 5/2010 | Ichida et al. |
| 7,722,488 B2 | 5/2010 | Kunisawa et al. |
| 7,722,489 B2 | 5/2010 | Tetsuka et al. |
| D617,690 S | 6/2010 | Tokumoto |
| 7,749,117 B2 | 7/2010 | Carrasco Vergara |
| 7,753,815 B2 | 7/2010 | Saifuddin et al. |
| 7,757,581 B2 | 7/2010 | Okamoto |
| 7,762,916 B2 | 7/2010 | Ichida et al. |
| 7,779,718 B2 | 8/2010 | Jordan et al. |
| 7,779,719 B2 | 8/2010 | Chiang |
| 7,779,724 B2 | 8/2010 | Fujii |
| 7,780,558 B2 | 8/2010 | Kunisawa |
| 7,805,268 B2 | 9/2010 | Takamoto |
| 7,806,022 B2 | 10/2010 | Hara |
| 7,824,285 B2 | 11/2010 | Tan |

(56) References Cited

U.S. PATENT DOCUMENTS

| | | |
|---|---|---|
| 7,841,255 B2 | 11/2010 | Fujii |
| 7,849,764 B2 | 12/2010 | Kua |
| 7,951,028 B2 * | 5/2011 | Wickliffe .................. 474/80 |
| 8,500,581 B2 * | 8/2013 | Lin .......................... 474/80 |
| 2001/0023621 A1 | 9/2001 | Blaschke et al. |
| 2001/0027695 A1 | 10/2001 | Lumpkin |
| 2002/0000136 A1 | 1/2002 | Feng et al. |
| 2002/0006842 A1 | 1/2002 | Tetsuka |
| 2002/0058558 A1 | 5/2002 | Patterson et al. |
| 2002/0078781 A1 | 6/2002 | Chen |
| 2002/0094906 A1 | 7/2002 | Jordan |
| 2002/0119849 A1 | 8/2002 | Maynard |
| 2002/0160869 A1 | 10/2002 | Barnett |
| 2003/0000332 A1 | 1/2003 | Blaschke |
| 2003/0000333 A1 | 1/2003 | Kawakami |
| 2003/0032509 A1 | 2/2003 | Thompson |
| 2003/0060316 A1 | 3/2003 | Jiang |
| 2003/0074997 A1 | 4/2003 | Wesling et al. |
| 2003/0096669 A1 | 5/2003 | Kawakami |
| 2003/0100393 A1 | 5/2003 | Nanko |
| 2003/0141125 A1 | 7/2003 | Wahl |
| 2003/0150290 A1 | 8/2003 | Hanatani |
| 2003/0153423 A1 | 8/2003 | Smith |
| 2003/0171175 A1 | 9/2003 | Shahana et al. |
| 2003/0171176 A1 | 9/2003 | Shahana et al. |
| 2003/0171177 A1 | 9/2003 | Ando |
| 2003/0171180 A1 | 9/2003 | Shahana et al. |
| 2003/0188599 A1 | 10/2003 | Takachi |
| 2003/0220163 A1 * | 11/2003 | Yin ......................... 474/80 |
| 2003/0221507 A1 | 12/2003 | Wessel et al. |
| 2003/0228947 A1 | 12/2003 | Valle |
| 2003/0230160 A1 | 12/2003 | Ritchey |
| 2004/0005951 A1 | 1/2004 | Tsai et al. |
| 2004/0029667 A1 | 2/2004 | Mercat et al. |
| 2004/0043852 A1 | 3/2004 | Chang |
| 2004/0043855 A1 | 3/2004 | Wei |
| 2004/0069090 A1 | 4/2004 | Iteya |
| 2004/0106482 A1 | 6/2004 | Nagano |
| 2004/0110586 A1 | 6/2004 | Shahana et al. |
| 2004/0157690 A1 | 8/2004 | Nankou |
| 2004/0166973 A1 | 8/2004 | Nanko |
| 2004/0171446 A1 | 9/2004 | Nanko |
| 2004/0171454 A1 | 9/2004 | Itou et al. |
| 2004/0237696 A1 | 12/2004 | Hilsky et al. |
| 2004/0237698 A1 | 12/2004 | Hilsky et al. |
| 2005/0081672 A1 | 4/2005 | Chen |
| 2005/0119080 A1 | 6/2005 | Wei |
| 2005/0126329 A1 | 6/2005 | Blaschke |
| 2005/0143206 A1 | 6/2005 | Tetsuka et al. |
| 2005/0173890 A1 | 8/2005 | Matsumoto et al. |
| 2005/0176535 A1 | 8/2005 | Matsumoto et al. |
| 2005/0192138 A1 | 9/2005 | Sze et al. |
| 2005/0192141 A1 | 9/2005 | Onogi et al. |
| 2005/0204854 A1 | 9/2005 | McLaughlin et al. |
| 2005/0205323 A1 | 9/2005 | Ichida et al. |
| 2005/0206123 A1 | 9/2005 | Young et al. |
| 2005/0215367 A1 | 9/2005 | Thomasberg |
| 2005/0215368 A1 | 9/2005 | Hoe |
| 2005/0218623 A1 | 10/2005 | Oishi et al. |
| 2005/0239587 A1 | 10/2005 | Ichida et al. |
| 2005/0284252 A1 | 12/2005 | Fukui |
| 2005/0288139 A1 | 12/2005 | Ichida et al. |
| 2006/0030440 A1 | 2/2006 | Zmurko |
| 2006/0035737 A1 | 2/2006 | Nankou |
| 2006/0053940 A1 | 3/2006 | McLaughlin et al. |
| 2006/0058133 A1 | 3/2006 | Tetsuka et al. |
| 2006/0058135 A1 | 3/2006 | Shahana |
| 2006/0096404 A1 | 5/2006 | Wessel et al. |
| 2006/0122016 A1 | 6/2006 | Hee |
| 2006/0128511 A1 | 6/2006 | Oishi et al. |
| 2006/0135301 A1 | 6/2006 | Shahana |
| 2006/0172840 A1 | 8/2006 | Kamada |
| 2006/0189424 A1 | 8/2006 | Chamberlain et al. |
| 2006/0205549 A1 | 9/2006 | Nonoshita et al. |
| 2006/0207375 A1 | 9/2006 | Jordan et al. |
| 2006/0211529 A1 | 9/2006 | Vergara |
| 2007/0021246 A1 | 1/2007 | Shahana et al. |
| 2007/0021248 A1 | 1/2007 | Shahana et al. |
| 2007/0026985 A1 | 2/2007 | Yamaguchi |
| 2007/0049437 A1 | 3/2007 | Wickliffe |
| 2007/0068312 A1 | 3/2007 | Sato |
| 2007/0068315 A1 | 3/2007 | Oseto |
| 2007/0093327 A1 | 4/2007 | Florczyk |
| 2007/0117666 A1 | 5/2007 | Ichida et al. |
| 2007/0129191 A1 | 6/2007 | Florczyk |
| 2007/0135250 A1 | 6/2007 | Kamada |
| 2007/0137386 A1 | 6/2007 | Kawakami |
| 2007/0137387 A1 | 6/2007 | Dal Pra |
| 2007/0137389 A1 | 6/2007 | Wickliffe |
| 2007/0137390 A1 | 6/2007 | Dal Pra' et al. |
| 2007/0137987 A1 | 6/2007 | Wang |
| 2007/0173360 A1 | 7/2007 | Shahana et al. |
| 2007/0178998 A1 | 8/2007 | Tetsuka |
| 2007/0191158 A1 | 8/2007 | Ichida et al. |
| 2007/0191159 A1 | 8/2007 | Fukuda |
| 2007/0193387 A1 | 8/2007 | Nakano |
| 2007/0193388 A1 | 8/2007 | Nakano |
| 2007/0193389 A1 | 8/2007 | Kawakami |
| 2007/0193497 A1 | 8/2007 | Iteya et al. |
| 2007/0199401 A1 | 8/2007 | Kawakami et al. |
| 2007/0202978 A1 | 8/2007 | Yamaguchi et al. |
| 2007/0207886 A1 | 9/2007 | Shahana |
| 2007/0214908 A1 | 9/2007 | Weiss |
| 2007/0219696 A1 | 9/2007 | Miller et al. |
| 2007/0221008 A1 | 9/2007 | Shipman et al. |
| 2007/0261507 A1 | 11/2007 | Funai |
| 2007/0261508 A1 | 11/2007 | Acenbrak |
| 2007/0293359 A1 | 12/2007 | Yamamoto et al. |
| 2007/0298920 A1 | 12/2007 | Nakai et al. |
| 2008/0004142 A1 | 1/2008 | Nakai et al. |
| 2008/0026888 A1 | 1/2008 | Yamamoto et al. |
| 2008/0026890 A1 | 1/2008 | Oseto |
| 2008/0026891 A1 | 1/2008 | Oseto |
| 2008/0032835 A1 | 2/2008 | Reynolds |
| 2008/0051237 A1 | 2/2008 | Shahana |
| 2008/0058136 A1 | 3/2008 | Muramoto et al. |
| 2008/0058144 A1 | 3/2008 | Oseto et al. |
| 2008/0064544 A1 | 3/2008 | Yamaguchi et al. |
| 2008/0064545 A1 | 3/2008 | Yamaguchi et al. |
| 2008/0081716 A1 | 4/2008 | Watarai et al. |
| 2008/0087131 A1 | 4/2008 | Tetsuka |
| 2008/0110288 A1 | 5/2008 | Okamoto |
| 2008/0115615 A1 | 5/2008 | Lim et al. |
| 2008/0121066 A1 | 5/2008 | Takebayashi et al. |
| 2008/0121452 A1 | 5/2008 | Bon |
| 2008/0125258 A1 | 5/2008 | Oseto |
| 2008/0125259 A1 | 5/2008 | Kunisawa et al. |
| 2008/0153639 A1 | 6/2008 | Tan |
| 2008/0153640 A1 | 6/2008 | Nagasawa |
| 2008/0153641 A1 | 6/2008 | Chen et al. |
| 2008/0167148 A1 | 7/2008 | Siah |
| 2008/0182689 A1 | 7/2008 | Fujii et al. |
| 2008/0188336 A1 | 8/2008 | Tokuyama |
| 2008/0194363 A1 | 8/2008 | Kunisawa |
| 2008/0196537 A1 | 8/2008 | Dal Pra' |
| 2008/0264748 A1 | 10/2008 | Chen |
| 2008/0272643 A1 | 11/2008 | Young et al. |
| 2008/0274845 A1 | 11/2008 | Valle et al. |
| 2008/0276748 A1 | 11/2008 | Chen |
| 2008/0300076 A1 | 12/2008 | Fukushima et al. |
| 2008/0305902 A1 | 12/2008 | Tetsuka et al. |
| 2009/0031846 A1 | 2/2009 | Dal Pra' et al. |
| 2009/0045601 A1 | 2/2009 | Colegrove et al. |
| 2009/0062045 A1 | 3/2009 | Kunisawa |
| 2009/0062049 A1 | 3/2009 | Cranston et al. |
| 2009/0062057 A1 | 3/2009 | Fujiwara |
| 2009/0069135 A1 | 3/2009 | Chiang |
| 2009/0088284 A1 | 4/2009 | Patterson |
| 2009/0098963 A1 | 4/2009 | Watarai et al. |
| 2009/0111625 A1 | 4/2009 | Valle et al. |
| 2009/0111631 A1 | 4/2009 | Wickliffe et al. |
| 2009/0137354 A1 | 5/2009 | Oseto et al. |
| 2009/0197718 A1 | 8/2009 | Nagasawa |
| 2009/0211828 A1 | 8/2009 | Bon |

(56) References Cited

U.S. PATENT DOCUMENTS

| | | |
|---|---|---|
| 2009/0235772 A1 | 9/2009 | Naka et al. |
| 2009/0247334 A1 | 10/2009 | Takachi et al. |
| 2009/0275429 A1 | 11/2009 | Deguchi et al. |
| 2010/0004079 A1 | 1/2010 | Watarai |
| 2010/0051398 A1 | 3/2010 | Spacek |
| 2010/0071499 A1 | 3/2010 | Weiss |
| 2010/0081527 A1 | 4/2010 | Auer |
| 2010/0093472 A1 | 4/2010 | Oseto et al. |
| 2010/0125029 A1 | 5/2010 | Nielson et al. |
| 2010/0160099 A1 | 6/2010 | Colegrove et al. |
| 2010/0184545 A1 | 7/2010 | Takachi et al. |
| 2010/0190593 A1 | 7/2010 | Vrielink |
| 2010/0218633 A1 | 9/2010 | Ichida et al. |
| 2010/0227718 A1 | 9/2010 | Chen |
| 2010/0234154 A1 | 9/2010 | Klieber |
| 2010/0252389 A1 | 10/2010 | French |
| 2010/0294068 A1 | 11/2010 | Fujii et al. |
| 2012/0142466 A1* | 6/2012 | Lin .................. 474/80 |
| 2012/0214628 A1 | 8/2012 | Meager et al. |
| 2013/0008282 A1 | 1/2013 | Johnson et al. |

OTHER PUBLICATIONS

U.S. Appl. No. 14/058,983, filed Oct. 21, 2013, Johnson et al.

International Preliminary Report on Patentability for International Patent Application No. PCT/US2012/022932, mailed Aug. 8, 2013, 10 pages.

International Search Report and Written Opinion for International Patent Application No. PCT/US2012/022932, mailed May 8, 2012, 11 pages.

\* cited by examiner

FIG. 4A
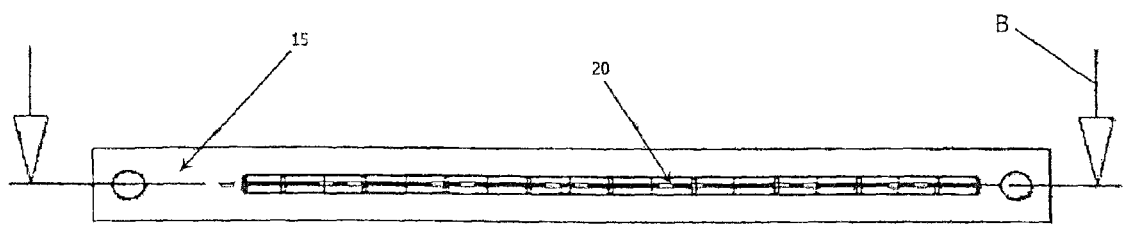
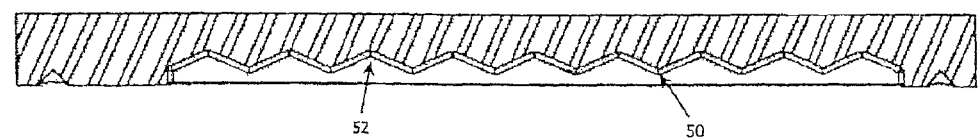
FIG. 4B

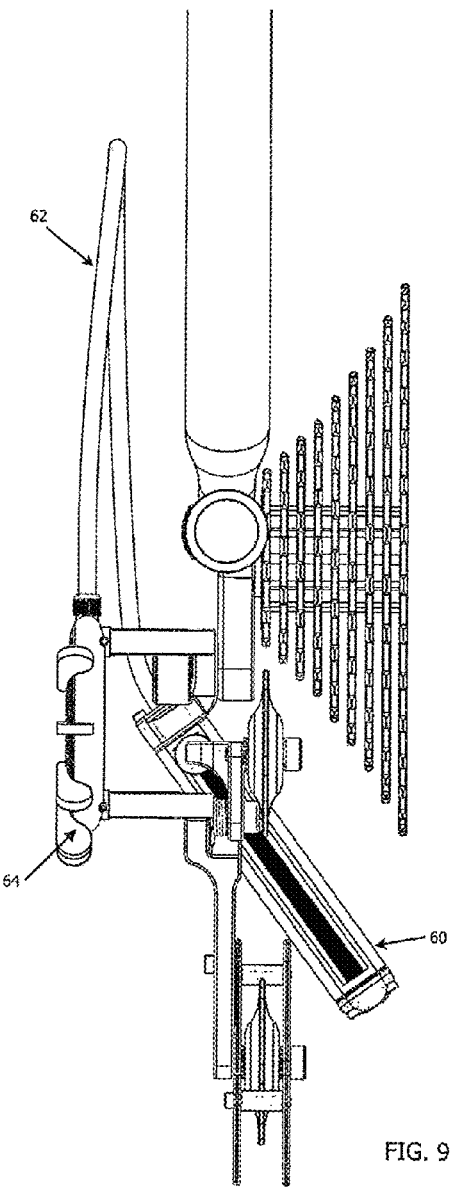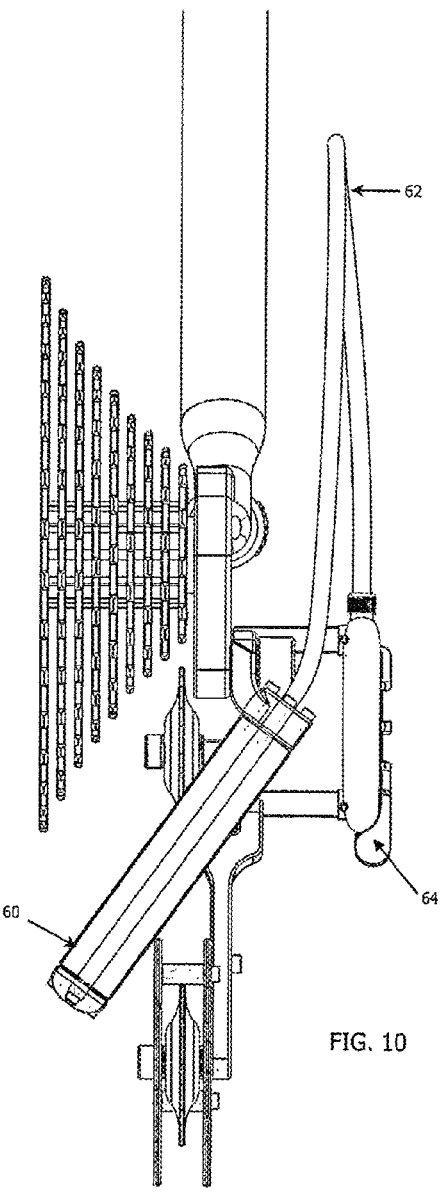
FIG. 9
FIG. 10

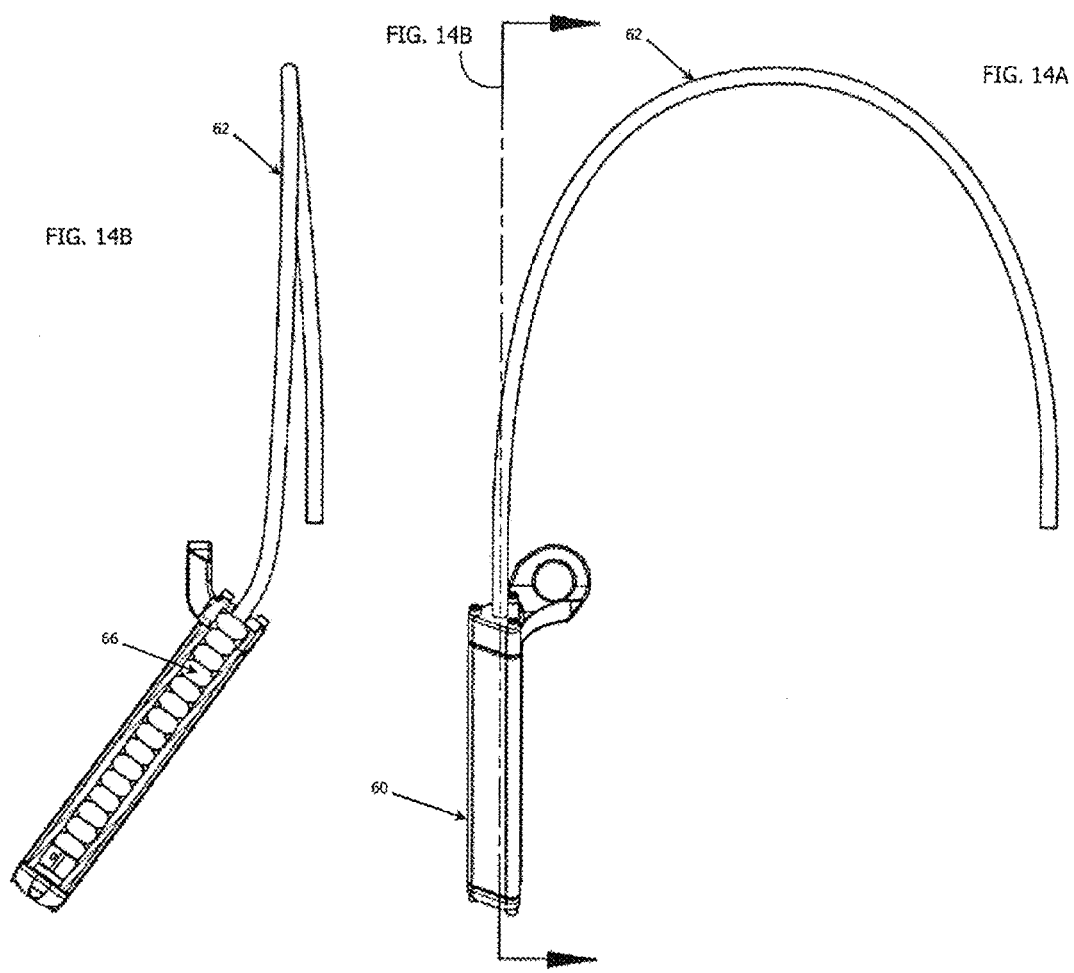

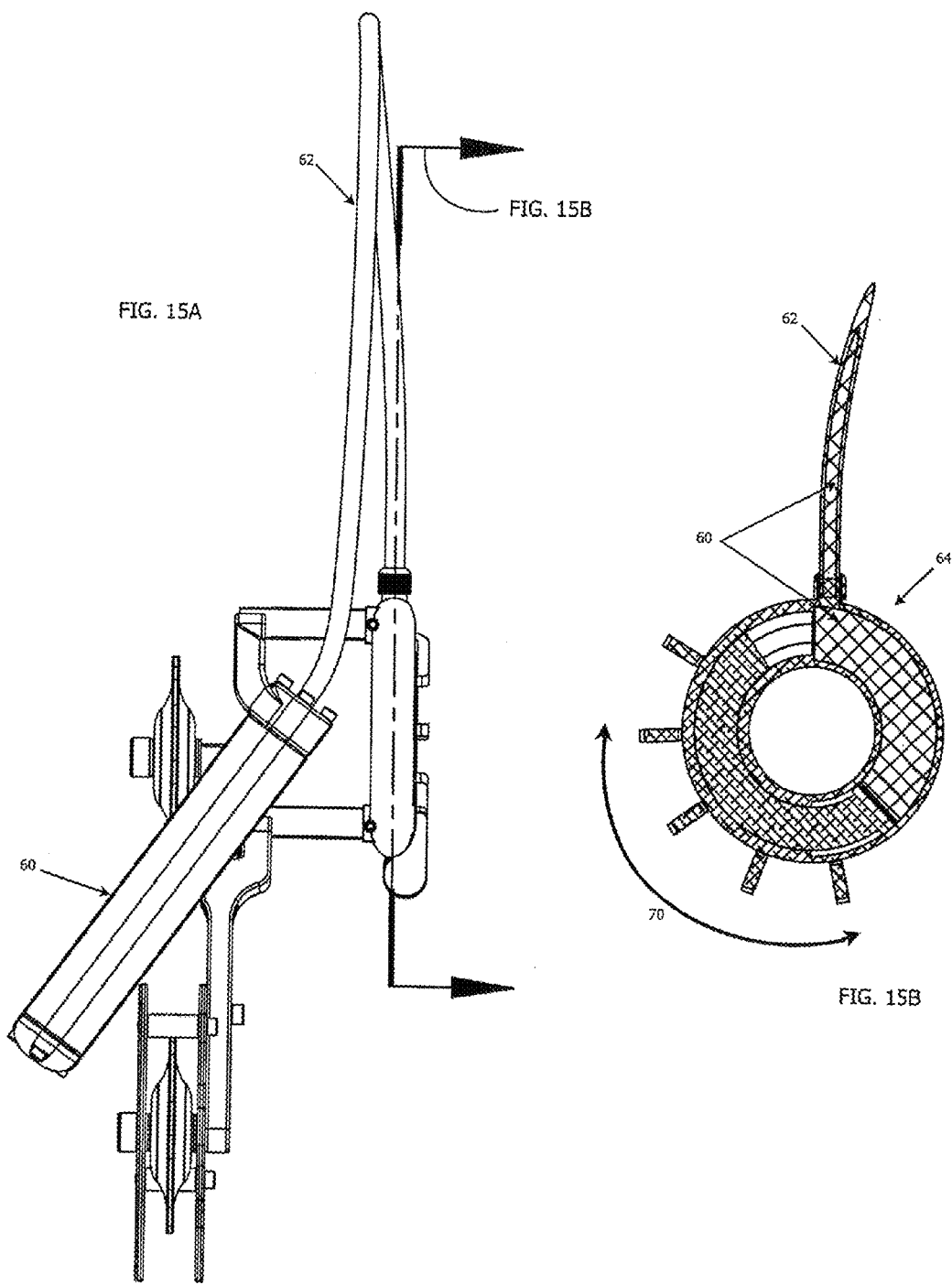

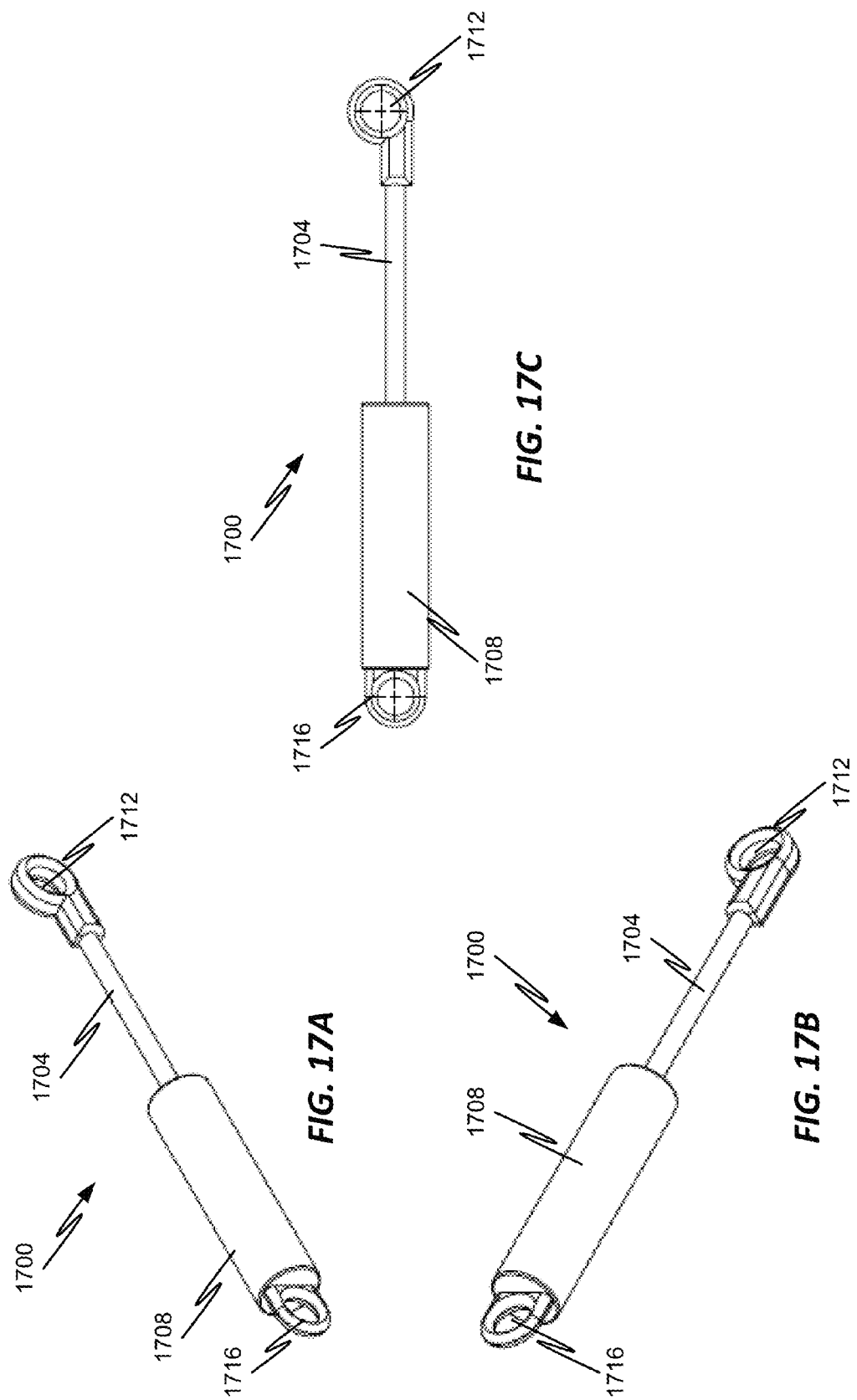

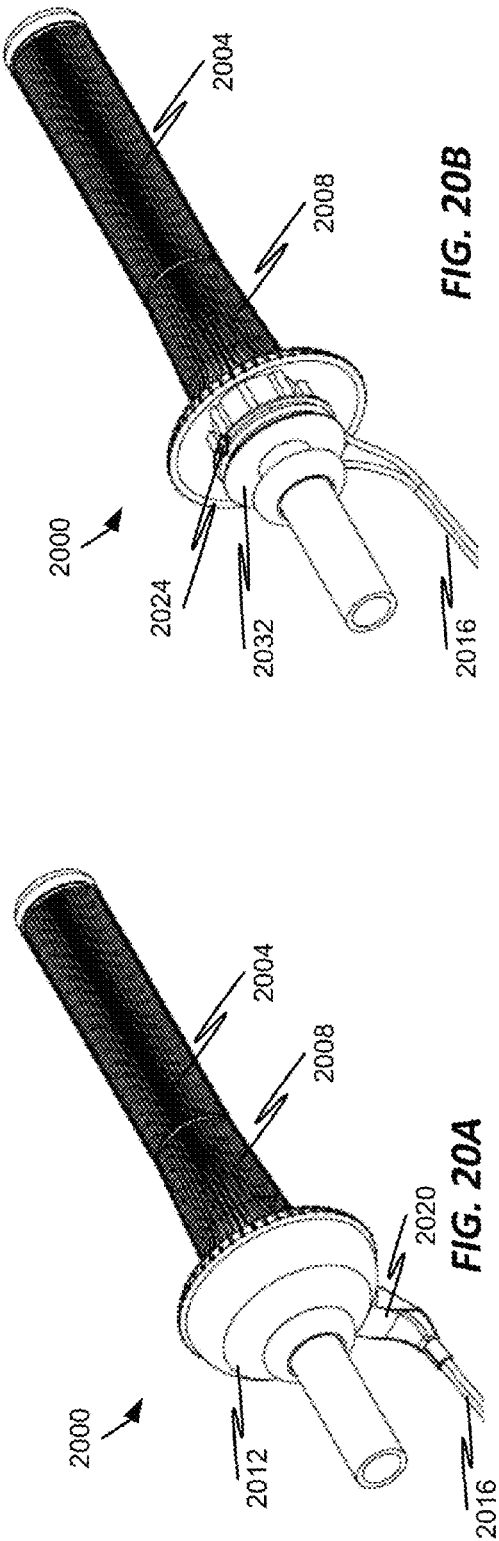
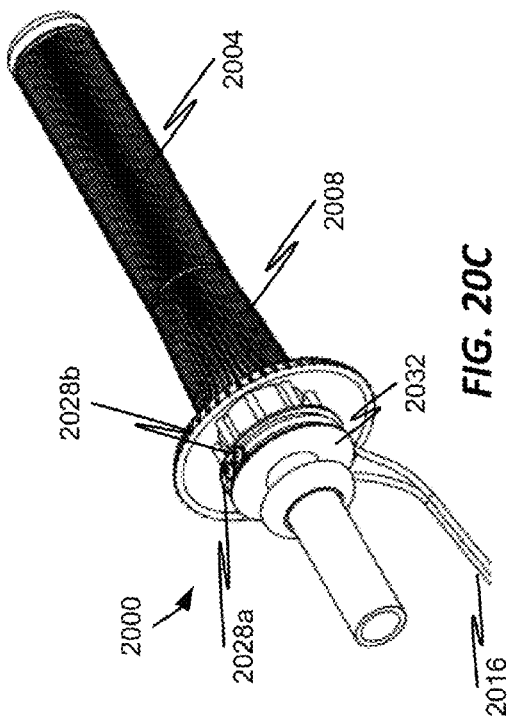

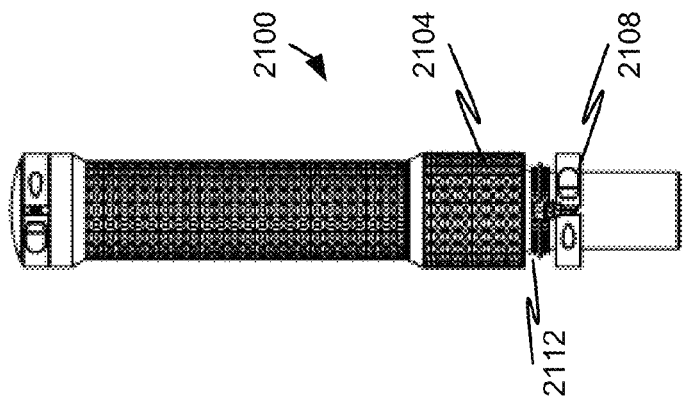
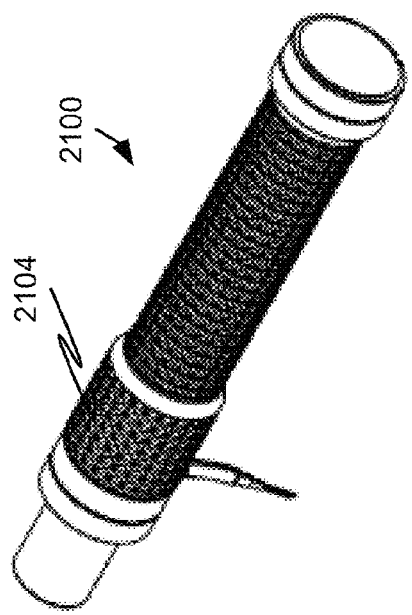
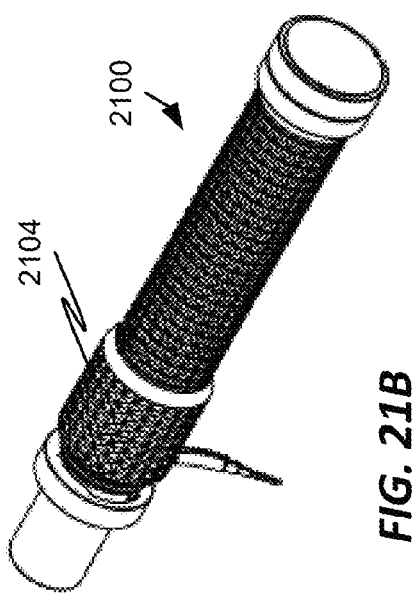

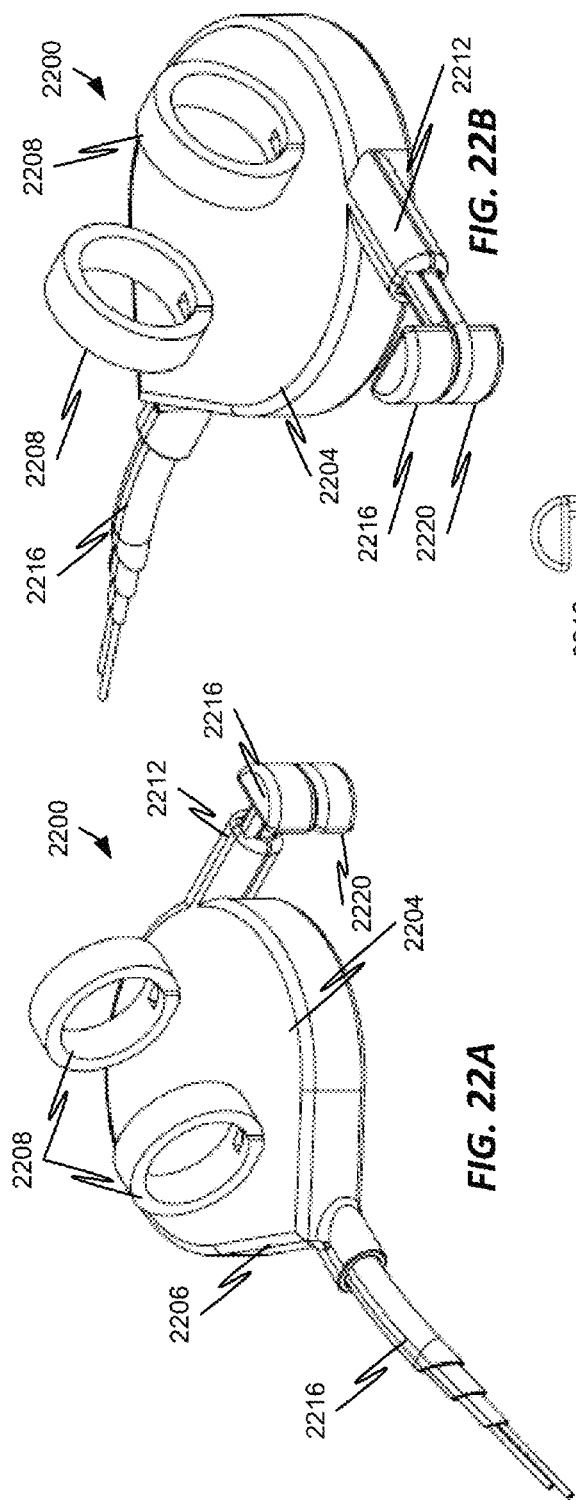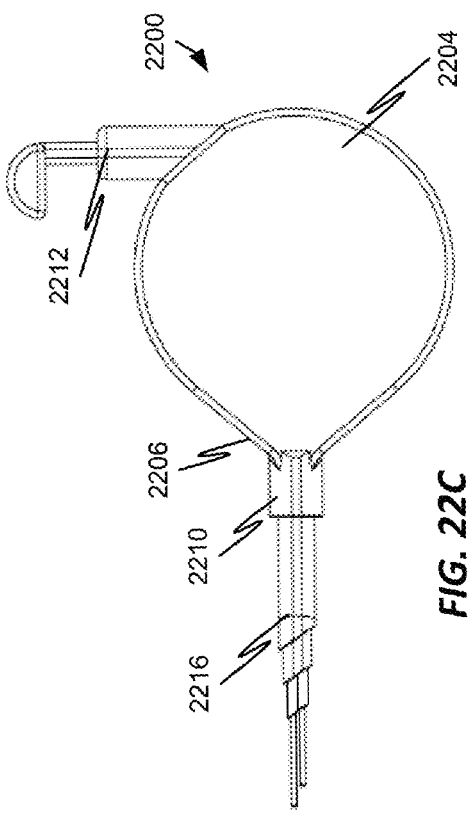

GEAR TRANSMISSION AND DERAILLEUR SYSTEM

CROSS-REFERENCE TO RELATED APPLICATIONS

This Non-Provisional Patent application is a Continuation-in-Part of U.S. patent application Ser. No. 13/360,164, filed Jan. 27, 2012, which claims the benefit of priority from U.S. Provisional Patent Application No. 61/484,037, filed May 9, 2011, and U.S. Provisional Patent Application No. 61/437,565, filed Jan. 28, 2011, the entire disclosures of which are hereby incorporated herein by reference.

BACKGROUND

Many prior art bike transmission systems use a shifter and derailleur combination that requires the shifter to hold tension on the derailleur by means of a large cable. In these prior art designs, the derailleur is controlled by a single cable from the shifter, requiring the derailleur to incorporate a large spring that is able to pull against the shifter, allowing the shifter to act as if it is pulling the derailleur back and forth between a plurality of gears, typically provided in a stacked arrangement known as a cassette. The shifter on these prior art designs is used to index the derailleur from gear to gear and contains complicated indexing components that help to align the derailleur as accurately as possible. Not only does this create a bulky, heavy and expensive shifter, but it also requires this added bulk to be mounted to handlebars, where aerodynamics are of concern.

By way of example, various known derailleur systems include U.S. Pat. No. 7,381,142 to Campagnolo, U.S. Pat. No. 4,437,848 to Shimano, U.S. Pat. No. 5,688,200 to White, and U.S. Pat. No. 4,183,255 to Leiter, all of which are hereby incorporated by reference in their entireties.

A significant problem with these prior art designs is that the cable is always under tension and as a result, the cable has the ability and tendency to stretch. When cable stretch occurs, which is common, the derailleur falls out of alignment with the sprockets, creating an undesirable shift, lowering efficiency, and in many cases, preventing the derailleur from shifting to the desired gear entirely. It is also difficult for prior art designs to perfectly align the derailleur with each sprocket due to the aforementioned cable slack issue as well as the fact that the prior art device used to regulate the accuracy of the derailleur is located almost two meters away from the system.

Cable slack in prior art designs is such a common problem that the designs have many adjustments incorporated into both the shifter and the derailleur to account for the issue. In addition, these prior art designs contain a chain slack device that is not only inefficient, but prevents the derailleur from functioning on sprockets that are over 36 teeth. On sprockets larger than 36 teeth, the chain slack arm is too close to the tire and ground to operate properly.

SUMMARY

Accordingly, there has been a long-felt and unmet need to provide a gear transmission and derailleur system that improves shifting accuracy and reduces or eliminates complications associated with chain slack. There has further been a long-felt and unmet need to provide a derailleur system with linear translation features that improves accuracy and is easy to use.

The Summary of the Disclosure is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

Embodiments of the present disclosure contemplate an improved gear transmission and derailleur system. For the purposes of the present disclosure, various embodiments may be referred to as the "InGear Transmission System" or the "InGear." The present disclosure provides a transmission system for bicycles that is more accurate, more efficient, removes the cable slack issue common to prior art designs and provides a derailleur system that reduces or eliminates the need to be tuned. In various embodiments, the InGear Transmission utilizes a user-interfacing control system, or "Cuff-Link" controller to operate a derailleur with ease of shifting. In various embodiments, the derailleur system may be referred to as the "Line Drive" or "Line Drive Derailleur."

The InGear system aligns a chain with the center of each sprocket. The Cuff-Link control is mounted to the handlebars and functions by pulling a wire back and forth. This actuation motion may be referred to herein as the "Pull-Pull" design. The Cuff-Link control comprises a pulley or similar feature that does not rely on indexing. Rather, the system pulls a cable back and forth to translate derailleur features from one gear to another. When the Cuff-Link control is connected to the derailleur of the present disclosure through a known cable, the Cuff-Link control is able to pull the derailleur back and forth along its entire track without the need for a large spring.

In various embodiments, the system further comprises a feature to regulate the position of the derailleur pulleys so that the derailleur pulleys can align a drive member to exactly the center of each of the sprockets. In various embodiments, this feature may be referred to as the "Gear Climb." The Gear Climb feature, in some embodiments, provides for automatic centering and alignment of the derailleur system, particularly when a user positions a Cuff-Link control in a position that does not exactly correspond to proper alignment with a cog or gear. Use of the terms "drive means" or "drive member" in the present disclosure relate a wide variety of devices including, but not limited to, chains, roller chains, bicycle chain, chain drives, belts, flat belts, round belts, vee belts, rotational shafts, universal joints, ropes, etc.

In various embodiments, a center device or apparatus for positioning a device such as a derailleur system in a plurality of predetermined positions is provided. The predetermined positions may correspond to, for example, a plurality of positions characterized by the derailleur aligning a drive member or chain with one of a plurality of cogs or sprockets. In one embodiment, the apparatus comprises a first member having a plurality of first surface features and a plurality of second surface features. The first member may be in the form of a linear track, a cylindrical track, or variations thereof as will be described herein and as will be recognized by one of skill in the art. A second member corresponding with the first member is provided and biased toward the first member. The second may be biased by a variety of known devices, including, by way of example only, a coil spring. The plurality of first surface features define points of dimensional instability, or increased potential energy, for the second member and the plurality of second surface features defining points of dimensional stability, or reduced potential energy for the second member. The first and second surface features may comprise, for example, peaks and valleys, notches, crests and troughs, magnets, etc. for securing derailleur components in a desired position. In various embodiments, the first and/or second members may be arranged in a linear manner. In one embodiments, the first and second members comprise opposing cylindrical members with radially disposed surface features defining a stable position when mated. The second member is provided in fixed force transmitting communication with the translatable device, such that when a pin, for example, is biased into a position of dimensional stability or lower potential energy, system components such as a derailleur and associated pulley wheel are translated therewith.

BRIEF DESCRIPTION OF DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
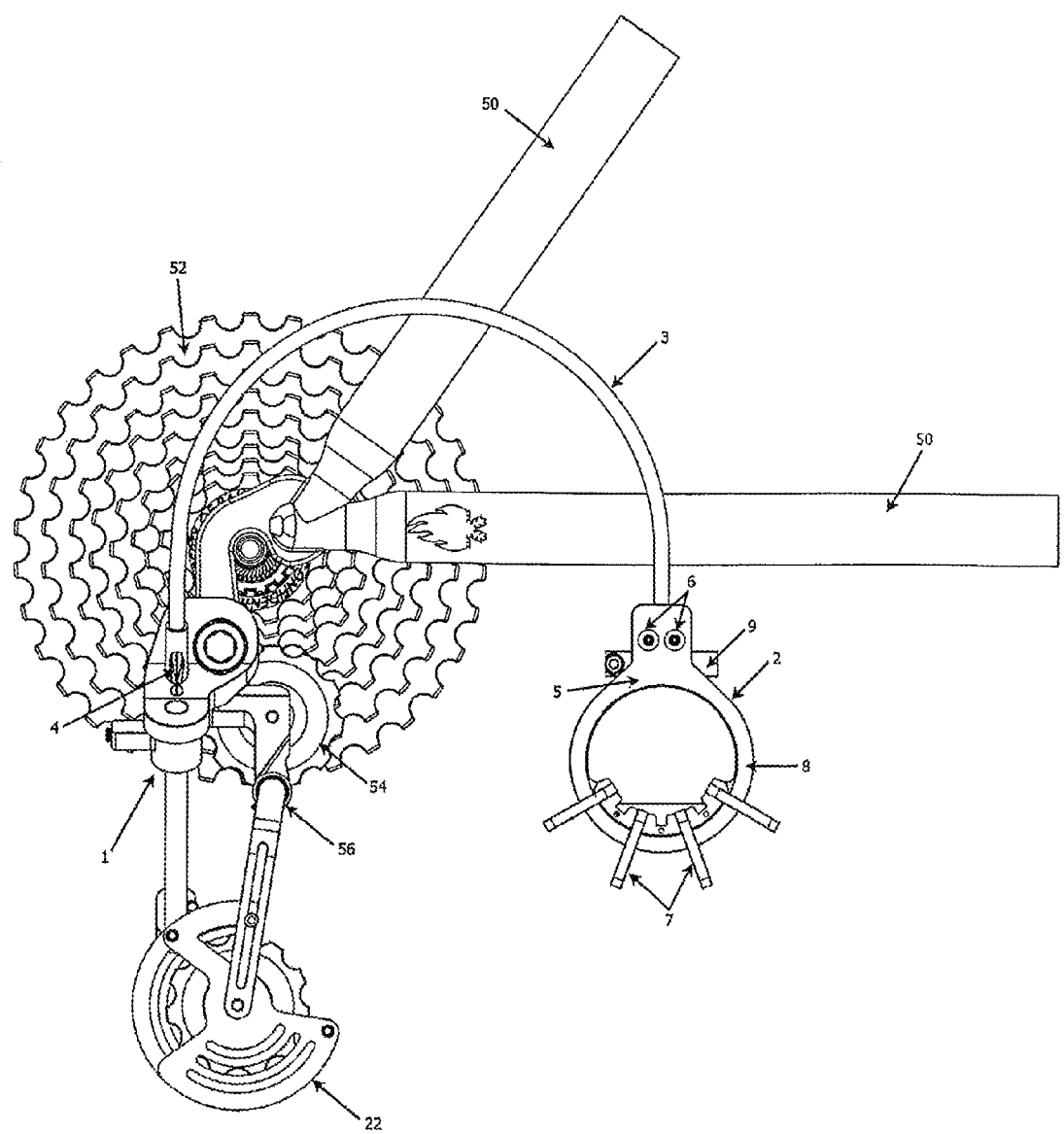
Figure 2:
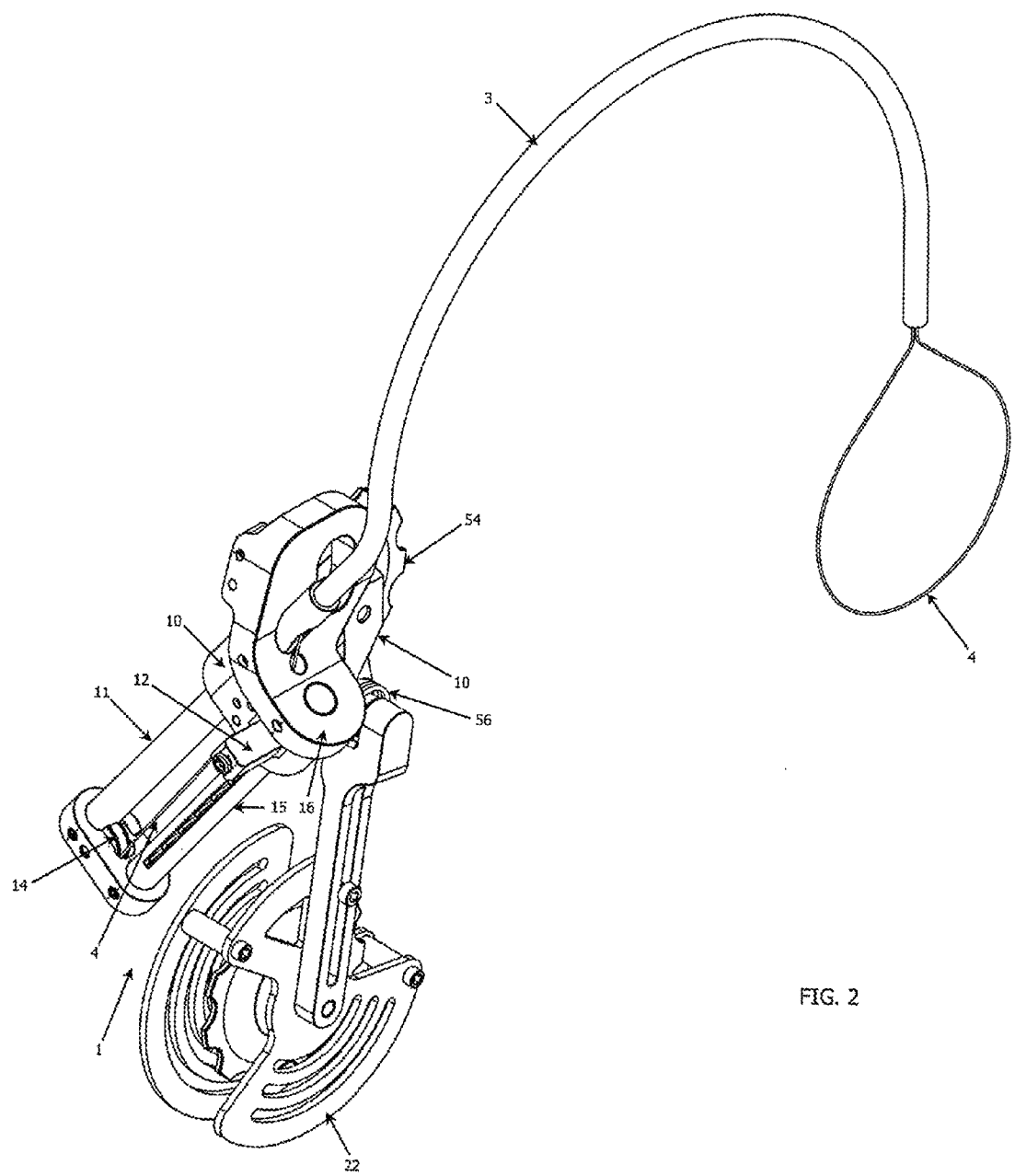
Figure 3A:
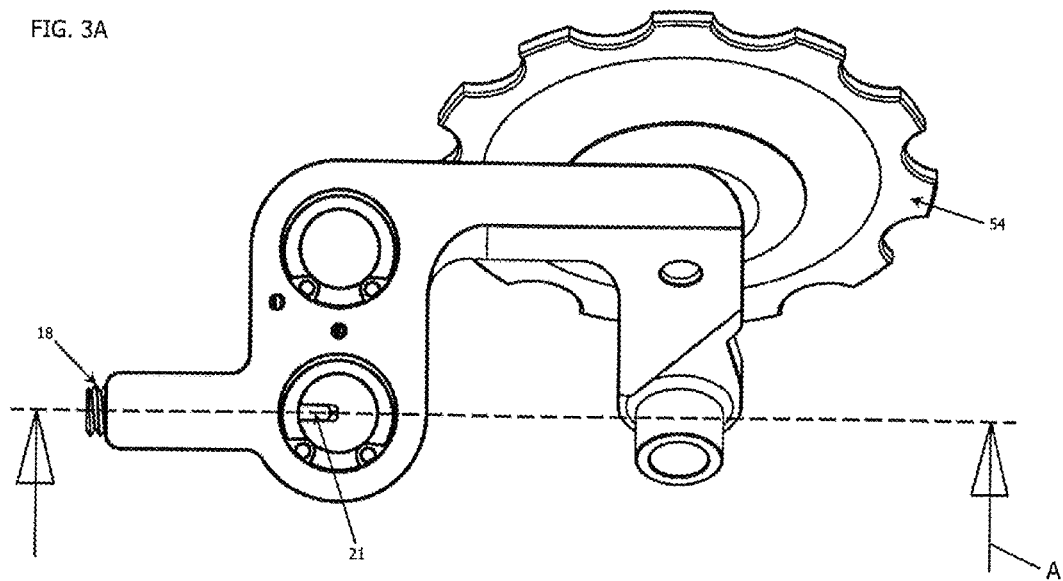
Figure 3B:
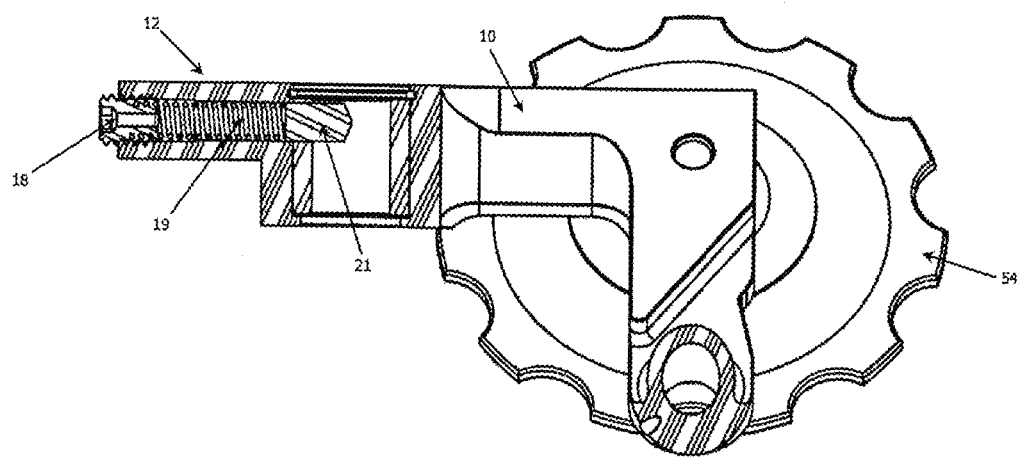
Figure 5:
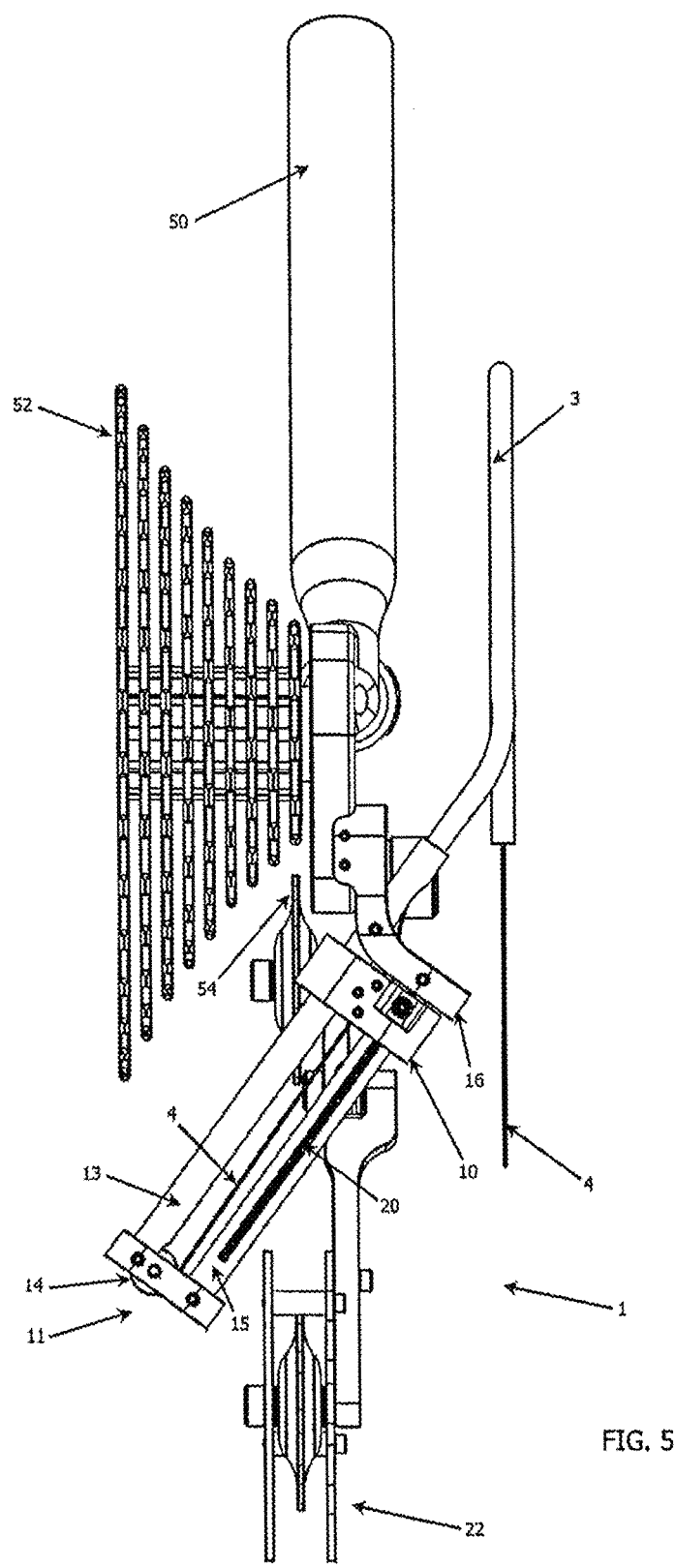
Figure 6:
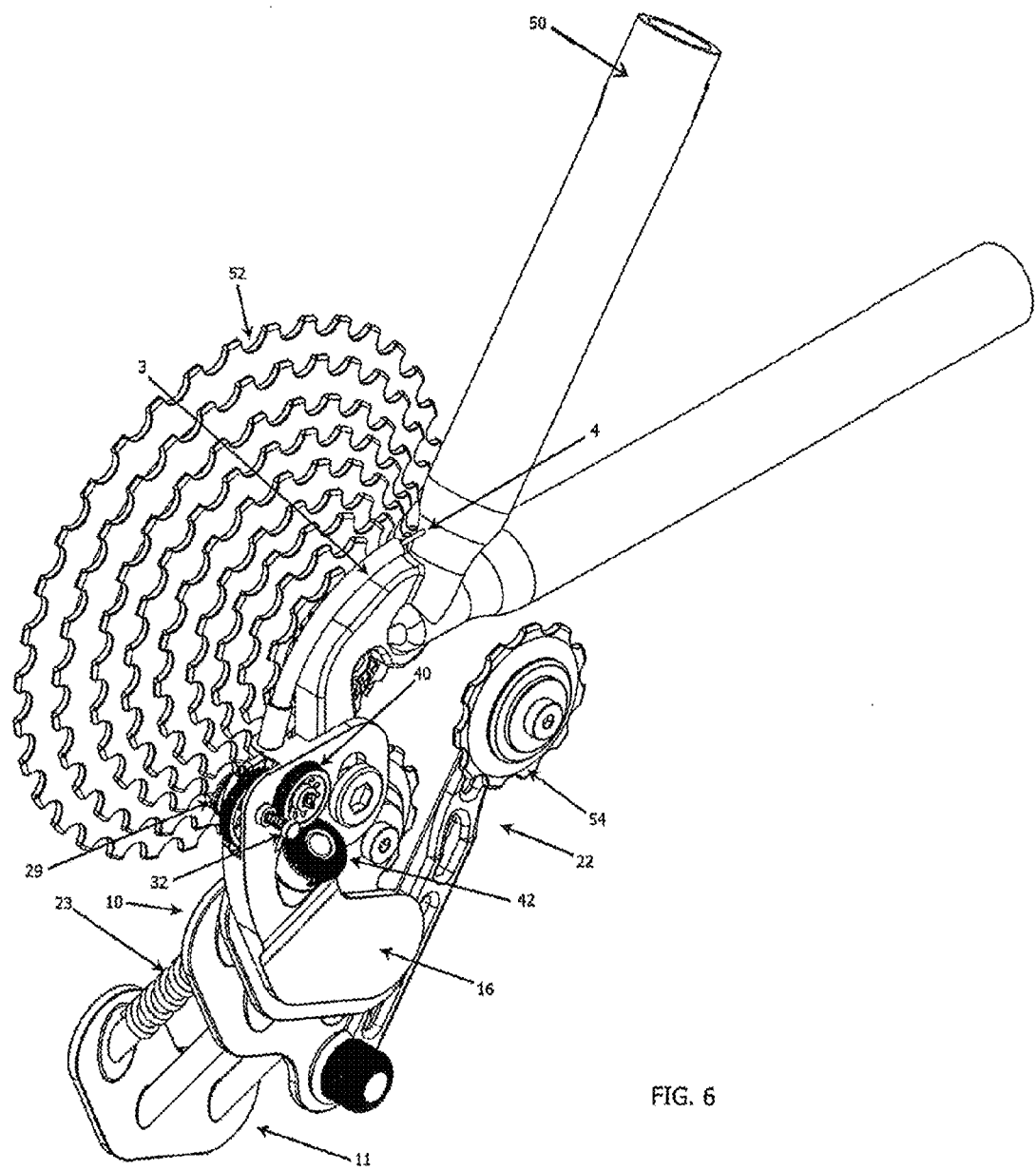
Figure 7A:
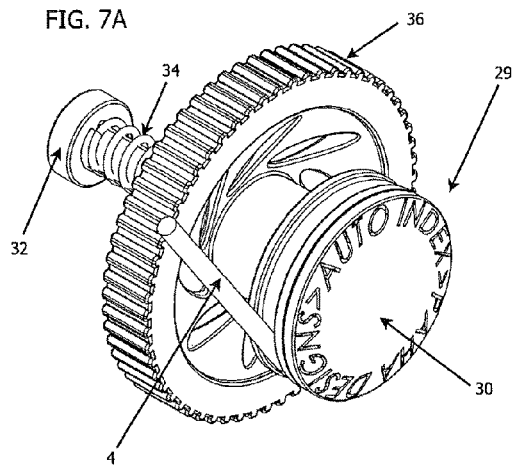
Figure 7B:
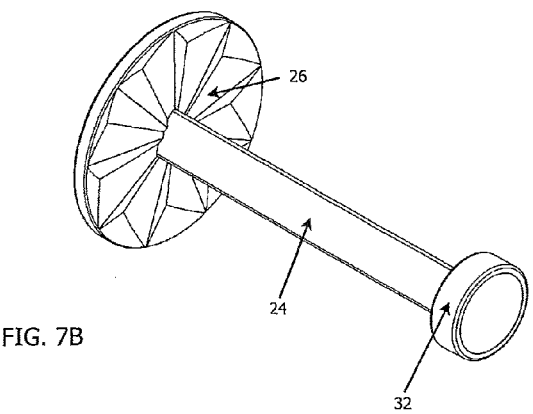
Figure 7C:
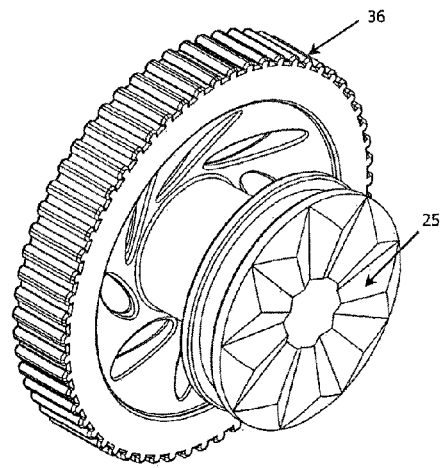
Figure 8:
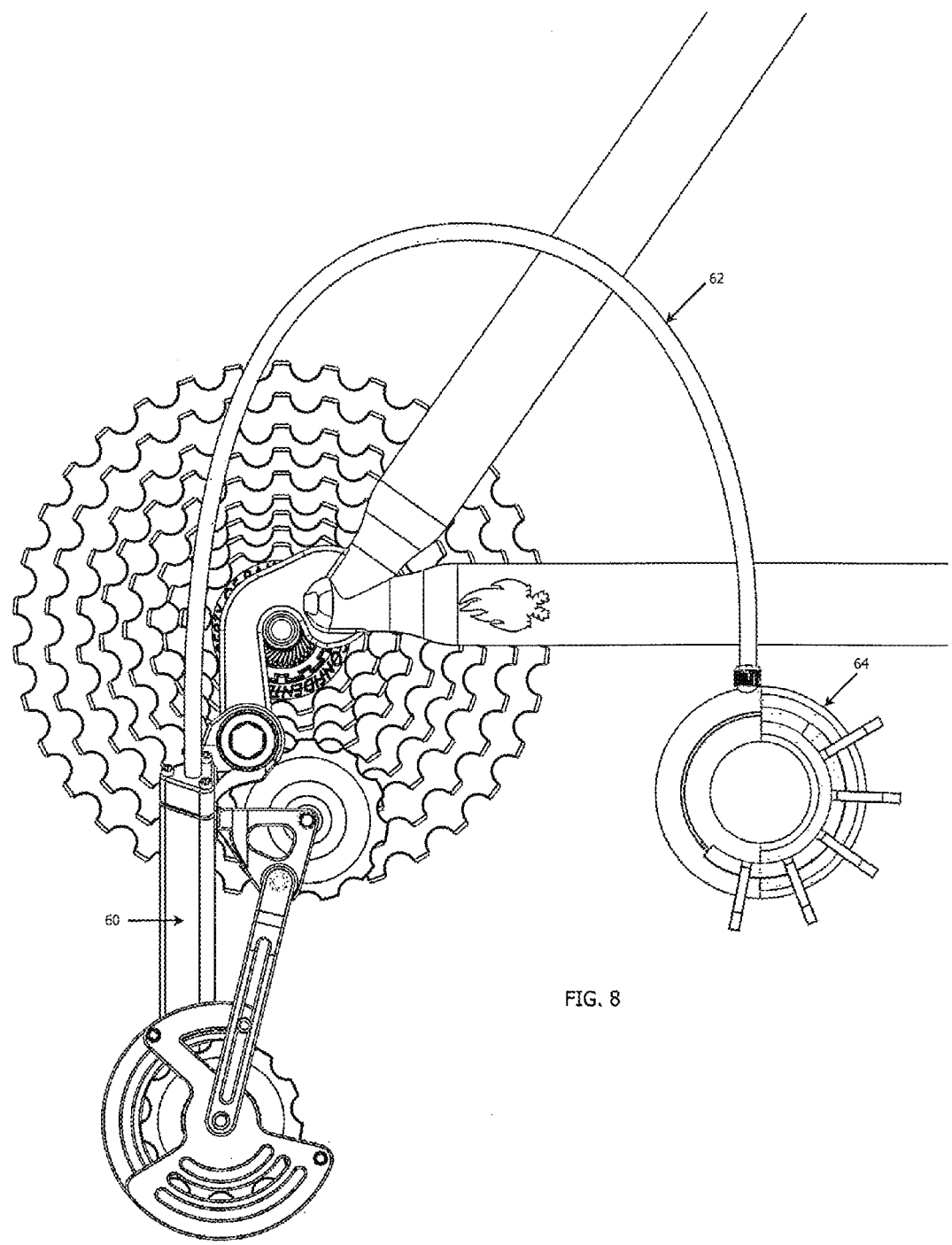
Figure 11:
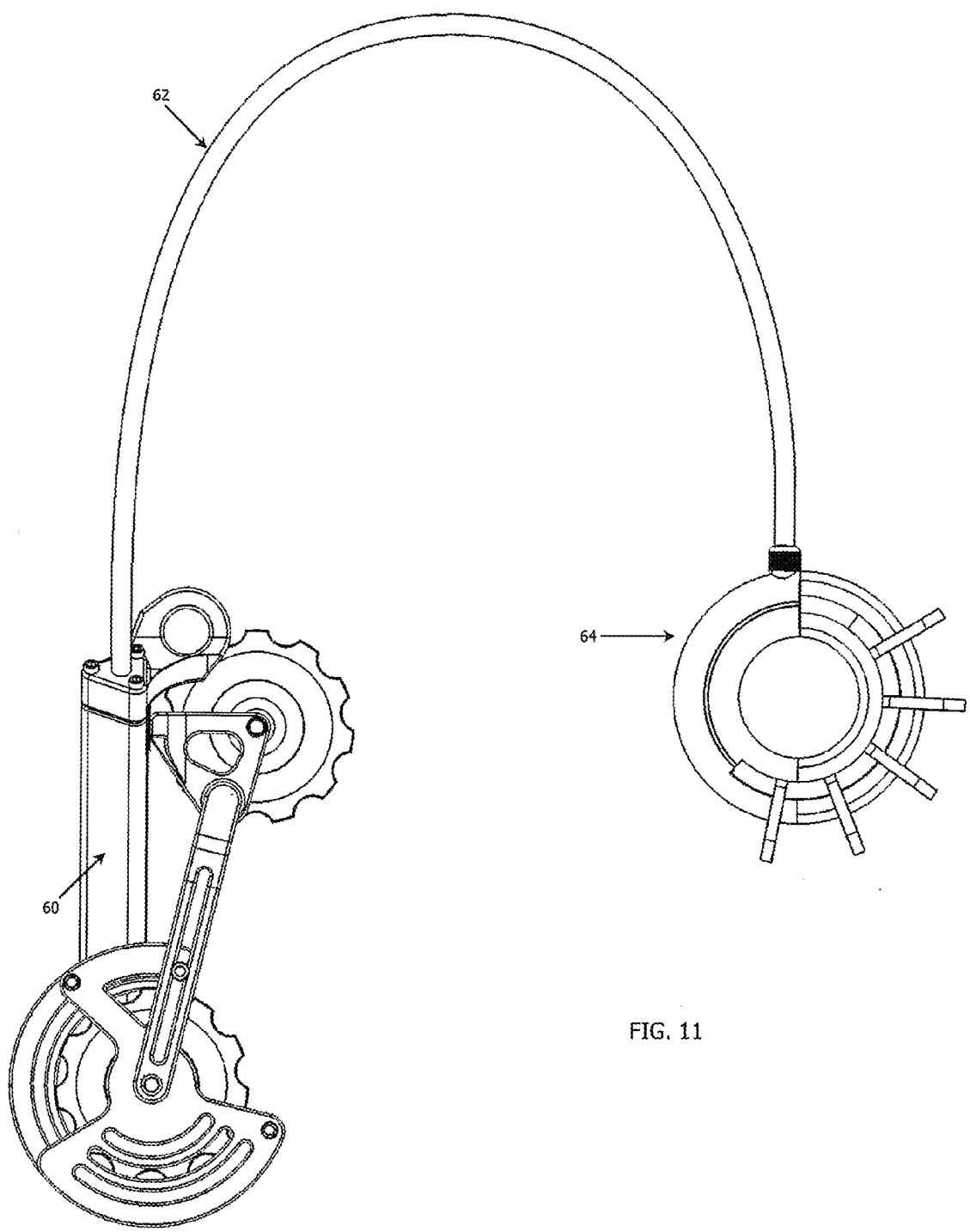
Figure 12:
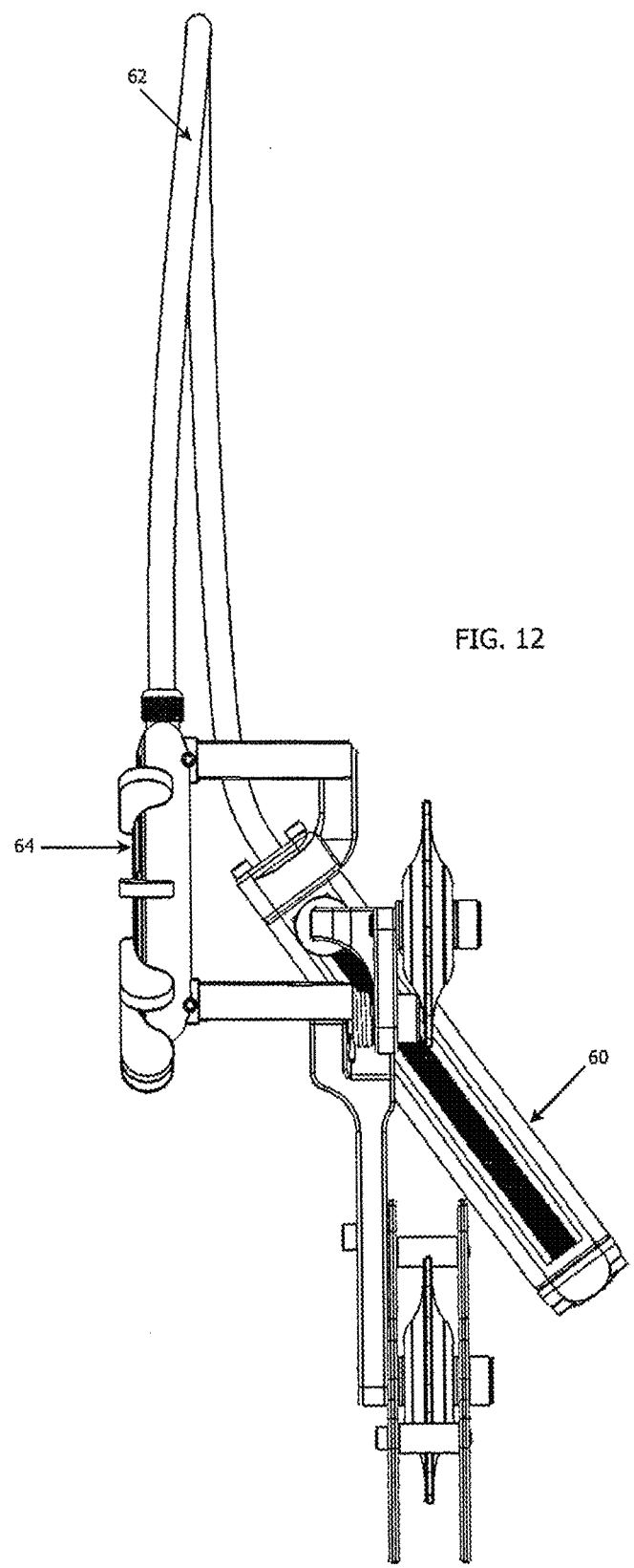
Figure 13B:
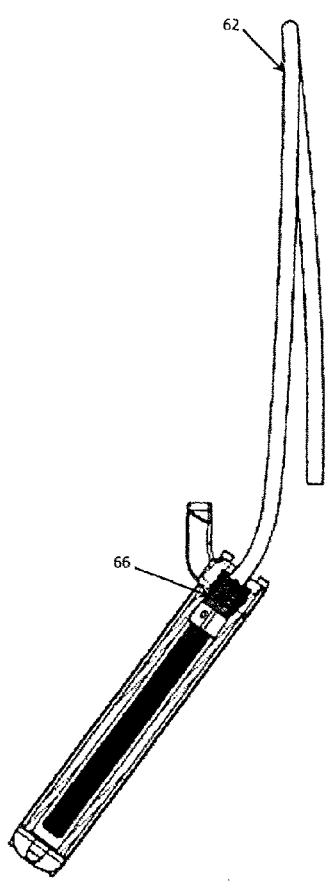
Figure 13A:
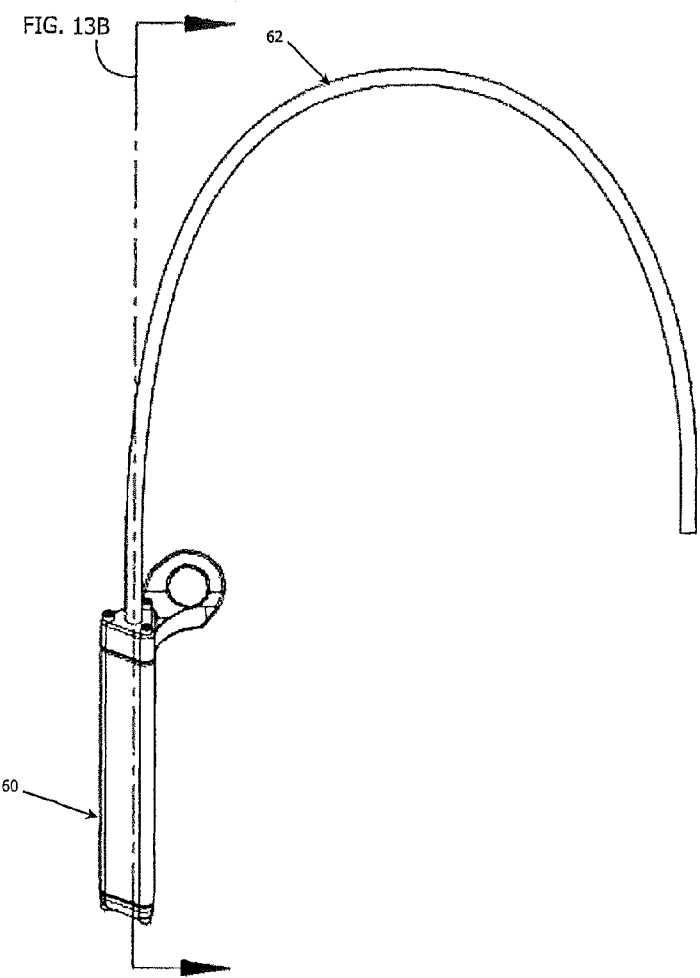
Figure 16C:
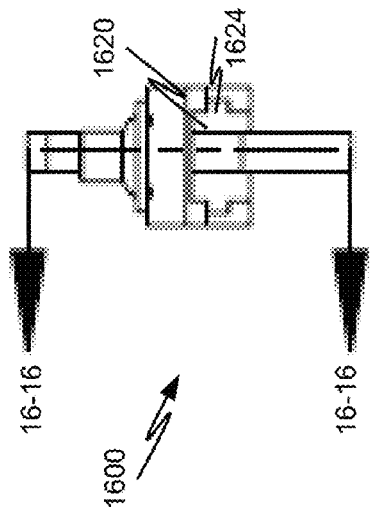
Figure 16D:
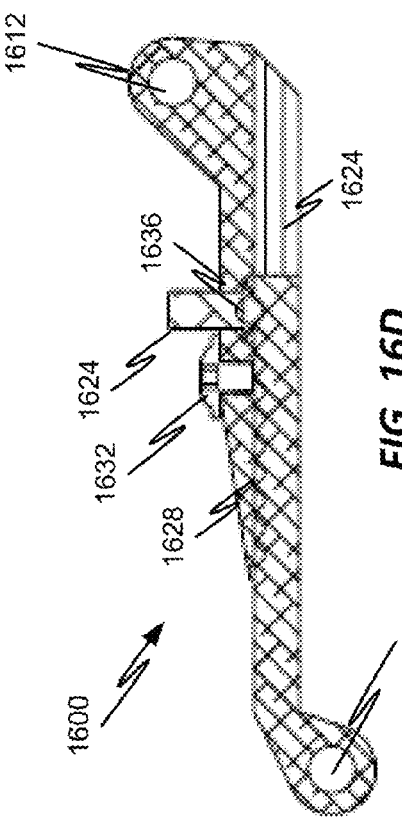
Figure 16A:
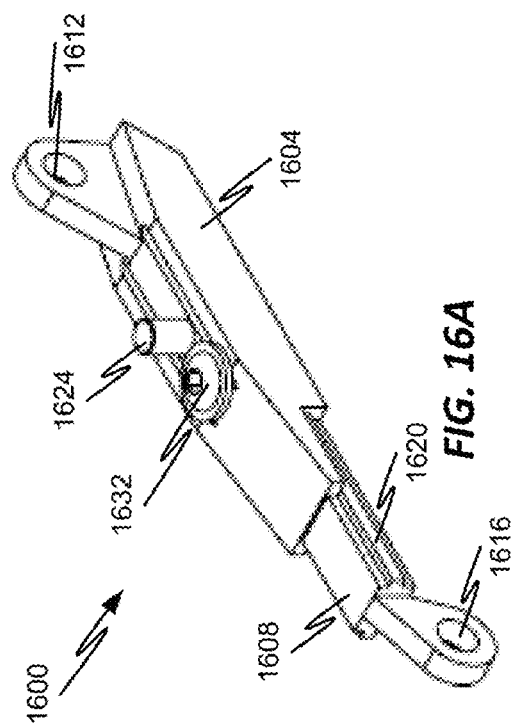
Figure 16B:
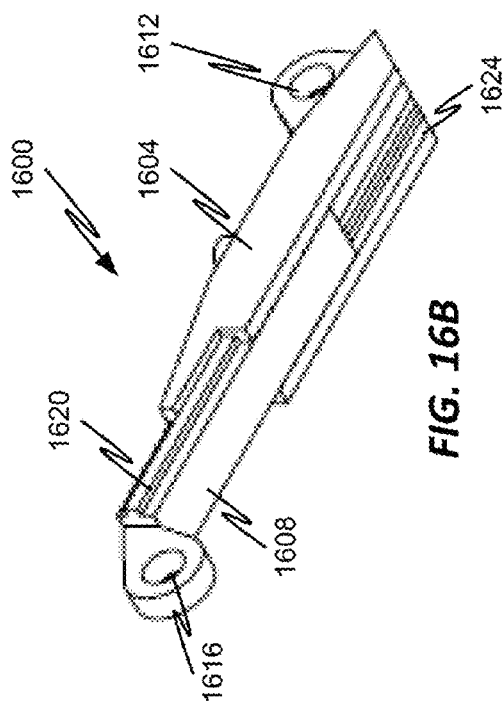
Figure 18B:
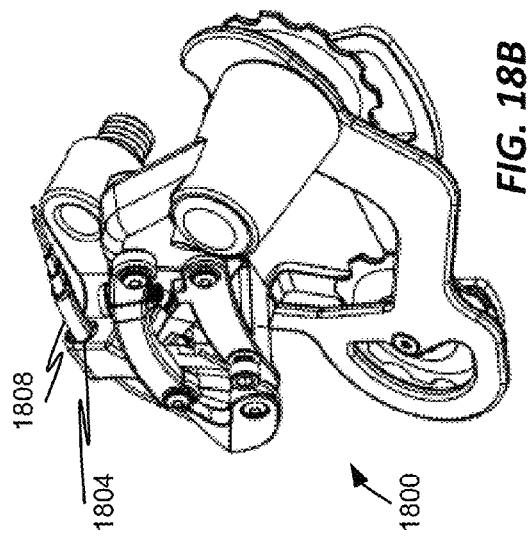
Figure 18C:
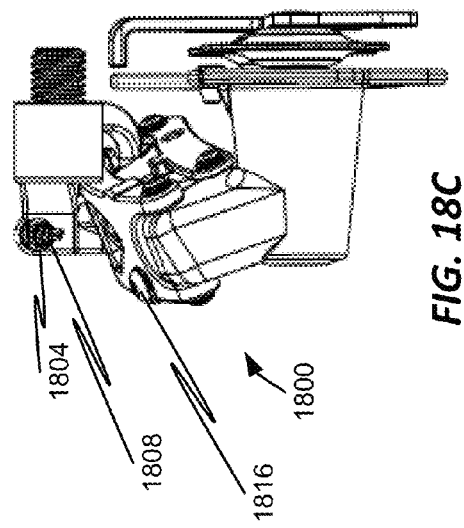
Figure 18A:
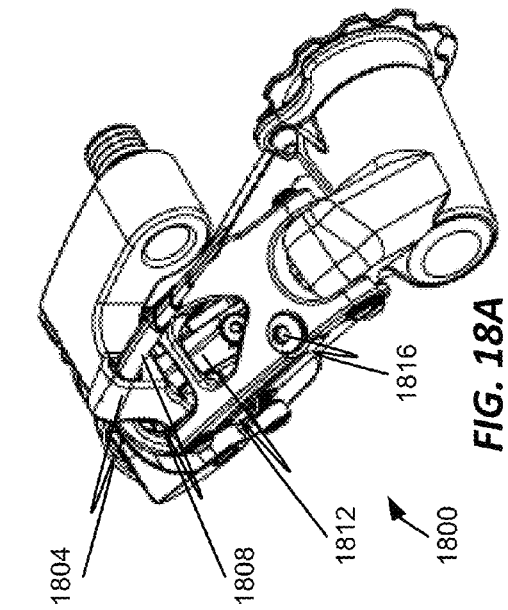
Figure 19B:
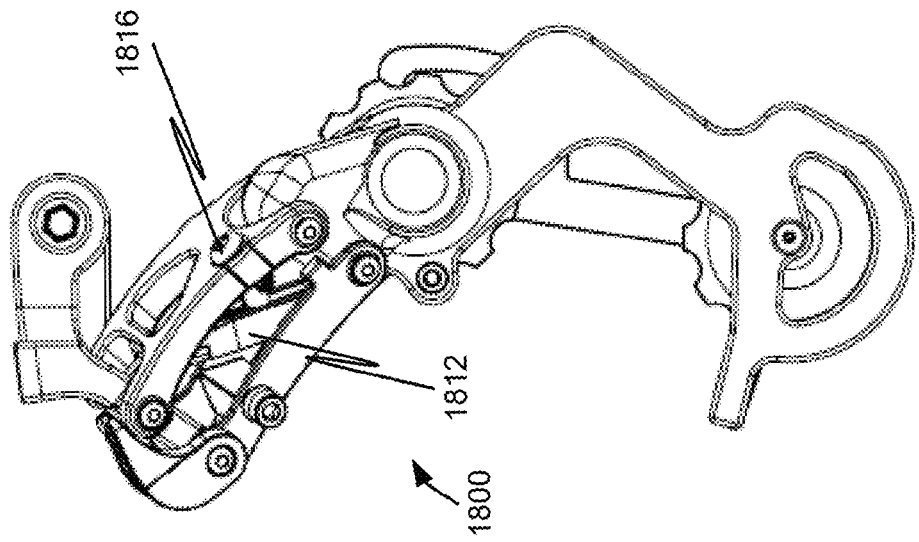
Figure 19A:
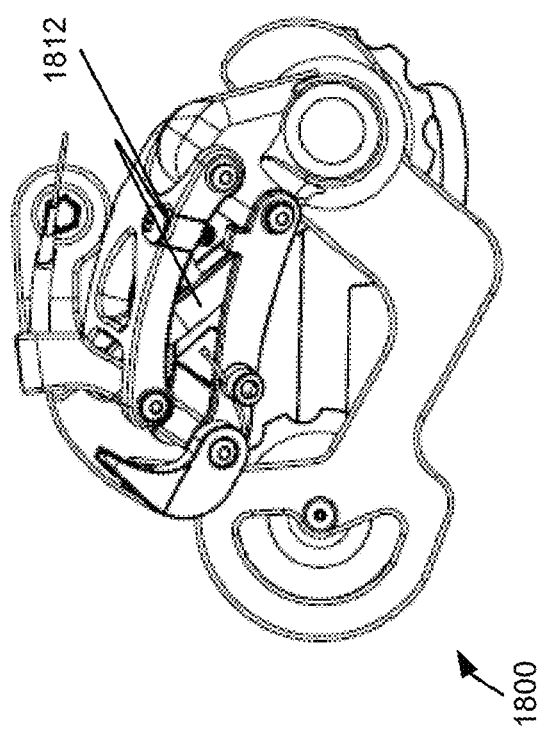
Figure 23B:
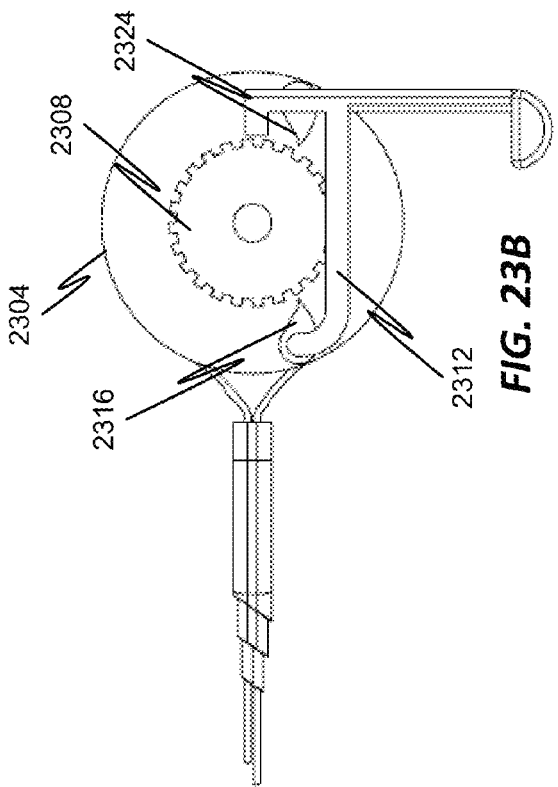
Figure 23A:
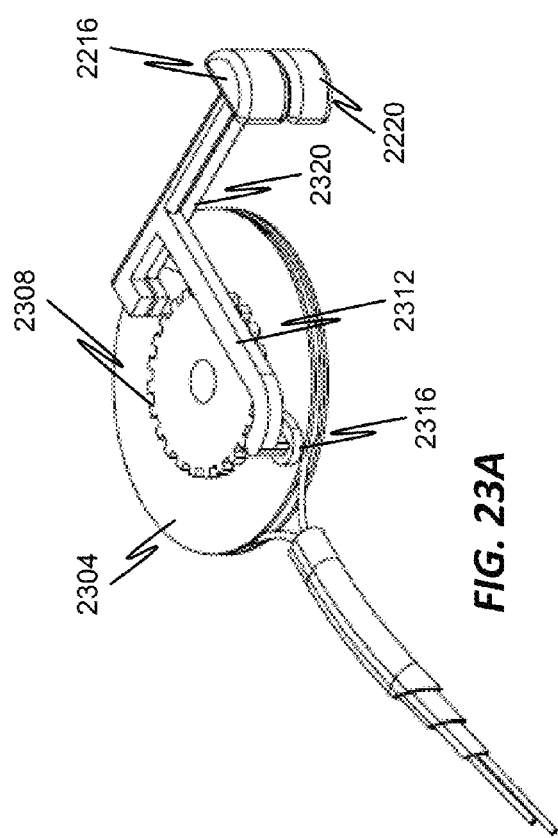

FIG. 1 is a side elevation view of a gear transmission and derailleur system and a bicycle frame according to one embodiment of the present disclosure;

FIG. 2 is rear perspective view of a gear transmission and derailleur system according to one embodiment of the present disclosure;

FIG. 3A is a first side view of a gear transmission and derailleur system according to one embodiment of the present disclosure;

FIG. 3B is a partial cut-away view of a gear transmission and derailleur system according to one embodiment of the present disclosure;

FIG. 4A is an elevation view of one embodiment of a gear centering device according to one embodiment of the present disclosure;

FIG. 4B is a cut-away view of one embodiment of a gear centering device according to one embodiment of the present disclosure;

FIG. 5 is a rear elevation of a gear transmission and derailleur system and a bicycle frame according to one embodiment of the present disclosure;

FIG. 6 is a rear perspective view of a gear transmission and derailleur system according to one embodiment of the present disclosure;

FIG. 7A is a first perspective view of a cylindrical gear centering device according to one embodiment of the present disclosure;

FIG. 7B is a second perspective view of a cylindrical gear centering device according to one embodiment of the present disclosure;

FIG. 7C is a third perspective view of a cylindrical gear centering device according to one embodiment of the present disclosure;

FIG. 8 is a side elevation view of a gear transmission and derailleur system and a bicycle frame according to one embodiment of the present disclosure;

FIG. 9 a front elevation view of a gear transmission and derailleur system according to one embodiment of the present disclosure;

FIG. 10 a rear elevation view of a gear transmission and derailleur system according to one embodiment of the present disclosure;

FIG. 11 is an isolation view of a gear transmission and derailleur system according to one embodiment of the present disclosure;

FIG. 12 is an isolation view of a gear transmission and derailleur system according to one embodiment of the present disclosure;

FIGS. 13A-13B provide a partial cross-sectional view of a gear transmission and derailleur system according to one embodiment of the present disclosure;

FIGS. 14A-14B provide a partial cross-sectional view of a gear transmission and derailleur system according to one embodiment of the present disclosure;

FIGS. 15A-15B provide a partial cross-sectional view of a gear transmission and derailleur system according to one embodiment of the present disclosure;

FIG. 16A provides a top isometric view of a gear centering device according to one embodiment of the present disclosure;

FIG. 16B provide a bottom isometric view of the gear centering device depicted in FIG. 16A;

FIG. 16C provides an elevational end view of the gear centering device depicted in FIG. 16A;

FIG. 16D provides a cross-section view along line 16-16;

FIG. 17A provides a top isometric view of a gear centering device according to one embodiment of the present disclosure;

FIG. 17B provides a bottom isometric view of the gear centering device depicted in FIG. 17A;

FIG. 17C provides an elevational side view of the gear centering device depicted in FIG. 17A;

FIG. 18A provides a top isometric view of a gear transmission and derailleur system according to one embodiment of the present disclosure;

FIG. 18B provides a bottom isometric view of the gear transmission and derailleur system depicted in FIG. 18A;

FIG. 18C provides an elevational end view of the gear transmission and derailleur system depicted in FIG. 18A;

FIG. 19A provides an elevational side view of the gear transmission and derailleur system depicted in FIG. 18A;

FIG. 19B provides an elevational side view of a second configuration of the gear transmission and derailleur system depicted in FIG. 18A;

FIG. 20A provides a top isometric view of an assembled shifter assembly according to one embodiment of the present disclosure;

FIG. 20B provides a top isometric view of a disassembled first shifter assembly according to one embodiment of the present disclosure;

FIG. 20C provides a top isometric view of a disassembled second shifter assembly according to one embodiment of the present disclosure;

FIG. 21A provides a top isometric view of an assembled shifter assembly according to one embodiment of the present disclosure;

FIG. 21B provides a top isometric view of a disassembled shifter assembly according to one embodiment of the present disclosure;

FIG. 21C provides a top view of the disassembled shifter depicted in FIG. 21B;

FIG. 22A provides a first top isometric view of an assembled shifter assembly according to one embodiment of the present disclosure;

FIG. 22B provides a second top isometric view of the assembled shifter assembly depicted in FIG. 22A;

FIG. 22C provides a top view of the assembled shifter assembly depicted in FIG. 22A;

FIG. 23A provides a top isometric view of a disassembled shifter assembly according to one embodiment of the present disclosure; and FIG. 23B provides a top view of the disassembled shifter assembly depicted in FIG. 23A.

DETAILED DESCRIPTION

The present disclosure has significant benefits across a broad spectrum of endeavors. It is the applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment of the method that illustrates the best mode now contemplated for putting the disclosure into practice is described herein by, and with reference to, the annexed drawings that form a part of the specification. The exemplary method is described in detail without attempting to describe all of the various forms and modifications in which the disclosure might be embodied. As such, the embodiments described herein are illustrative, and as will become apparent to those skilled in the arts, can be modified in numerous ways within the scope and spirit of the disclosure, the disclosure being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean " . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning Finally, unless a claim element is defined by reciting the word "means" and a function without the recital of any structure, it is not intended that the scope of any claim element be interpreted based on the application of 35 U.S.C. §112, sixth paragraph.

FIG. 1 shows one embodiment of the present disclosure with a Line Drive derailleur 1, a Cuff-Link controller 2, a cable housing 3, and a cable 4. As used herein, derailleurs of the present disclosure may be referred to as "Line Drive" derailleurs and user-controlled or controllable features for actuating a derailleur may be referred to as "Cuff-Link" controllers. For illustration purposes, the cable housing 3 and cable 4 are depicted with lengths shorter than would typically be provided. The cable and associated housing may be provided in any number of lengths, as will be recognized by one of skill in the art, to accommodate different sized vehicles, transmission system arrangements, etc.

In one embodiment, the cable housing 3 runs along a bike frame 50 so as to allow the Cuff-Link controller 2 to be mounted to the handlebars of the bicycle, for example, and operate a user-controlled manual transmission feature. In one embodiment, the Cuff-Link controller 2 is provided as the means for actuating a cable and associated transmission features. In alternative embodiments, it is contemplated that various alternative features may be provided for transmitting a user-applied force to a transmission cable or wire. Thus, the present disclosure is not limited to the contemplated Cuff-Link system. Various alternative devices, such as that disclosed in U.S. Pat. No. 6,513,405 to Sturmer et al., which is hereby incorporated by reference in its entirety, may be provided with features of the present disclosure.

The Cuff-Link controller 2 with the cable housing 3 and the cable 4, in various embodiments, is provided as a long cable that travels from the derailleur 1, through the Cuff-Link controller 2 and back to the Line Drive derailleur 1. One or more controller pulleys 8 are provided internal to the controller 2, which allows a user to pull the cable 4 back and forth by applying force to one or more levers 7 provided on the controller 2. The levers 7 are directly attached to the controller pulley 8 in a variety of locations. The number and locations of levers 7 may be varied to allow a user to vary the feel and look of their individual Cuff-Link Controller 2.

The levers 7 are used to pull the pulley 8 back and forth, which in turn, pulls the cable 4 back and forth. The controller 2 may be attached to a variety of locations on a vehicle, such as the handlebars or frame of a bicycle. In some embodiments, the controller 2 does not provide indexing or additional friction as in the prior art designs. Rather, the controller 2 imparts a tension on the cable 4 by means of the user pushing the lever(s) 7 in either direction. Attachment rings 9 are provided in various embodiments to securely attach the controller 2 in a position. Alternatively, the controller 2 may comprise various known attachment features used to attach the device to the bicycle.

Cable bearings 6 are provided to ease the friction of the cable as it enters and exits the controller 2 and the cable housing 3 as shown in FIG. 1. The cable 4 is disposed around the pulley 8 in a looped configuration. That is, a first end of the cable 4 is passed through and/or wrapped around a pulley and transmitted back into the cable housing approximately 360 degrees from the entrance point of the cable. Two portions of the cable 4 are therefore provided in parallel interior to the housing 3, with a length of the cable 4 being wrapped around the pulley 8 of the controller 2. The cable 4 may be secured to the pulley 8 in a variety of means. The cable 4, for example, may be press fit into a peripheral recess in the pulley and/or clamped with the assistance of various fasteners provided in connection with the controller. Alternatively, the cable 4 may be centrally connected to the controller 2 such that the controller can pull either end of the cable back and forth. In yet another embodiment, two cables may be connected to the controller at their ends such that the controller can move either cable back and forth. These and other means for securing the cable to the controller will be recognized by those of skill in the art. It will be expressly recognized that gear centering features of the present disclosure may be provided with any number of shifting devices and methods.

FIG. 2 is a perspective view of one embodiment of the present disclosure wherein a derailleur 1 and associated components, including a cable housing 3 and cable 4. The derailleur 1, comprises a housing 11, a slider feature 10 (the "Line Drive Slider") to which drive pulleys are attached, and a gear centering device 12 (the "Gear Climb").

The cable 4 according to various embodiments is provided in an endless loop configuration. That is, a looped cable is provided with one end looped around a pulley 8 of a controller 2 and a second end is looped through a slider portion 10 and guide 11 of a derailleur. As shown in FIG. 2, a portion of the endless loop cable 4 passes through guide member or housing 11 and is wrapped around pulley member 14 and connected to the slider 10 such that the cable 4 is in force-transmitting communication with the slider. Application of tension to the visible portion of the cable 4 in FIG. 2 will translate the slider 10 and connected components downwardly along the guide members 11, 15, thus downshifting the vehicle under conventional gearing and/or cassette arrangements. The cable 4, provided in an endless loop configuration and doubled upon itself interior to the housing 3, is secured to the slider 10 such that the cable imparts a tension force to the slider 10 in one of two directions, depending upon the direction of rotation applied to the controller 2.

In one embodiment, the housing 11 is attached to a vehicle in a fixed position and does not move relative to the vehicle during the operation of the system. The housing comprises a shaft 13, a cable pulley 14, a centering device shaft 15, and a mounting plate 16. The shaft 13 is used as a portion of the shaft track system for the slider feature 10, as well as the attachment point for the cable housing and a routing device for the cable 4 into the cable pulley 14. The cable pulley 14 is used to route the cable from the center of the shaft 13, which is preferably hollow, into one side of the slider 10 so as to allow the cable 4 to pull the slider 10 down the shafts 13, 15 of the housing 11. An aperture 17 is provided in the mounting plate 16 and another aperture provided in the shaft 13, which allow for one end of the cable 4 to exit the cable housing 3 and enter the top of the slider 10 to allow the cable 4 to pull the slider 10 up the shafts 13, 15 of the housing 11.

The slider 10 and associated chain slack device 22 and pulleys, translate in both directions along shafts 13, 15 of the housing 11 and thus manipulate a chain or drive means across a set of sprockets (e.g., cassette). The slider 10 also accounts for chain slack, as further shown and described herein. The slider 10 is pulled in either direction across the shafts 13, 15 by the cable 4 and regulates its exact position on the shafts 13, 15 by means of a gear centering device 12.

The gear centering device, or "Gear Climb" 12, further illustrated in FIGS. 3A-3B and 4A-4B, positions the slider 10 such that the drive means (not shown) aligns properly with a sprocket or gear. As will be recognized by one of skill in the art, when a derailleur and drive means are not properly aligned with a gear, chain rub can occur, causing reduced performance, excess chain wear, and inconvenience to a user. In one embodiment, the gear centering device 12 comprises a setscrew 18, a compression or coil spring 19, a track 20, and a pin 21. The setscrew 18 controls the pressure of the spring 19 on the pin 21, allowing the strength of the Gear Climb feature 12 to be adjusted to the preference of the user. The spring 19 provides force against the pin 21 and drives the pin 21 and the slider 10 into an appropriate position. The track 20 and pin 21 thereby provide for an unstable system when components of the system are not properly aligned with the center of a gear. The pin 21 will always seek a position of lower potential energy (i.e. in a recess of the teeth provided in the gear centering device), such a position corresponding to a drive means being aligned with the center of a gear. As used herein, lower potential energy relates to a condition of the system characterized by a lower energy configuration. In various embodiments, this condition relates to the reduced potential energy configuration of a spring and/or components in communication with a spring. While features of the present disclosure may utilize or implicate gravitational considerations, the use of the term potential energy is not limited to gravitational potential energy.

As shown in the section cut view of FIGS. 4A-4B, the Gear Climb track 20 comprises a set of peaks 50 and valleys 52, the valleys aligned with and corresponding to the center of each sprocket on a cassette. The distance between the valleys on the Gear Climb Track, in some embodiments, corresponds to the distance between the centers of each sprocket on the cassette. Additionally, the shafts 13, 15 share an angle that is the same as or at least substantially similar to an angle formed by stacked arrangement of the cassette from the largest to the smallest sprocket.

Application of force to the levers 7 of the controller 2 pulls the cable 4 in a desired direction, forcing the pin 21 to climb or overcome one of the peaks of the track 20. When such a force is removed from the lever 7, the spring 19 biases the pin into the closest valley, aligning the slider 10 with the center of the closest sprocket on the cassette. To facilitate such centering action, the pin 19 preferably comprises a pointed, rounded, or tapered end such that the pin, and therefore the slider assembly, is not prone to coming to rest on a peak of the Gear Climb. Rather, the pointed end of the pin 19 and geometry of the peaks help ensure that the pin will bias toward a valley, where the derailleur is properly aligned with the center of the desired sprocket. As shown in FIGS. 4A-4B, nine valleys 52 are provided corresponding to a cassette with nine gears. It will be expressly recognized, however, that greater or fewer valleys 52 may be provided to correspond to cassettes known to have greater or fewer than nine gears.

In various embodiments, the slider 10 comprises chain slack device 22, particularly where the device 2 is to be used in combination with a chain as the drive means. The chain slack device secures chain slack, such as that resulting from shifting into smaller sprockets on the cassette with a chain length necessary for larger sprockets. As will be recognized, a chain of a certain length may be provided so as to be capable of being disposed around large sprockets (i.e. low gears). The same length chain should also operate effectively even when transmitted to cogs with fewer teeth and a smaller radius. To account for slack inherent in having the chain positioned on such smaller radius gears, a biased pulley 22 is provided and enables a "slacked" chain to travel along an intended path and communicate effectively with various different gears on a cassette. The chain slack device 22 comprises a biasing member 56, such as a torsion spring. The biasing member 56 applies a sufficient force to account for chain slack without imparting excess force or tension on a chain or drive means.

In contrast with various prior art designs which swing or bias a chain slack arm towards the rear of the bicycle during its slack taking operation, for example, the present disclosure swings or biases a pulley towards the front of the vehicle, creating a smaller overall derailleur shape when geared to its largest sprocket. As such, system components are kept further away from the tire and dirt. The chain slack device 22 also allows for a smaller, lighter, and more efficient chain. In addition, the chain slack feature 22 of the present disclosure helps to maintain chain momentum and thereby increases efficiency.

FIG. 5 provides a rear elevation view of a transmission system according to one embodiment of the present disclosure. As shown, a derailleur system 1 is attached to a bicycle frame 50 and generally aligned with a cassette 52 comprising a plurality of gears. The derailleur system 1 comprises a slider 10 actuated by a cable 4 maintained within a cable housing 3. The slider 10 travels along a path generally defined by shafts 13, 15, wherein shaft 15 comprises a gear centering device with a track 15 as shown and described herein. The slider 10 and associated components (e.g. chain slack device 22 and chain pulley 54) are actuated by application of tension in either of two directions on the cable 4. The slider and associated components are thereby translated in an analog manner (e.g., non-incrementally). The gear centering device 12 operates to correct a condition whereby a drive means or chain is placed in a position that does not align with the center of a gear. In various embodiments, a chain slack device 22 is provided wherein the chain slack arm uses a compression spring or an extension spring to add tension to the chain, as opposed to a torsion spring used in common chain slack devices.

To operate the system, a user applies a force on a controller 2, preferably while applying force to the drive means, such as by pedaling the crank arms of a bicycle. The force applied to the controller 2 applies a tension on the cable in one of two directions, sliding the slider 10 up or down the shafts 13, 15. When the force is no longer applied to a lever 7 or other component of the controller 2, the slider 10 automatically finds the center of the closest sprocket under the influence of the gear centering features.

FIG. 6 presents yet another embodiment of a transmission system of the present disclosure. As shown, a cylindrical gear centering device 29 is provided and the slider 10 is actuated by a worm gear 23. The worm gear 23 can be operated in a variety of ways, including but not limited to a controller and cable, a motor with wireless/wired control switch, hydraulics or pneumatics 26. The worm gear 23 is provided to actuate the slider 10 and translate the mechanism back and forth.

As shown in more detail in FIGS. 7A-7C, a cylindrical gear centering device 29 is provided, comprising corresponding toothed cylindrical tracks 25, 26 and a pin 24 with associated flange head 30. The flange head 30 comprises a first cylindrical track 26 a series of peaks and valleys that mate with peaks and valleys of corresponding cylindrical track 25, which is in fixed communication with additional components such as cog 36. Cog 36 transfers force to additional system elements, such as a rotational worm gear 23 for translating a derailleur slider 10.

FIG. 7A is a perspective view of a cylindrical Gear Climb or auto-indexing device 29. As shown, a cable 4 may be connected to a cylindrical track 25 in fixed communication with and useful for rotating a cog 36. A second cylindrical track 26 is biased against first cylindrical track 25 and useful for biasing the rotational position of the cog 36 and associated components toward one or more positions corresponding to the center of a gear. Second cylindrical track 26, which comprises a series of undulations or peaks and valleys corresponding to those of the first cylindrical track 25, is biased against the first track 25 by, for example, a coil spring 34 disposed around an axial pin 24 and associated flange 32. FIG. 7B depicts the second track 26, pin 24 and flange 32 in a reverse perspective view as compared to FIG. 7A. The undulations on track 26 correspond to those provided on track 25, as shown in the partial exploded view provided in FIG. 7C. The interaction of the corresponding teeth or undulations on the cylinders 25, 26 in combination with the force applied by biasing member 34 provide for an unstable condition whenever components of the system are not properly aligned with a single gear. Such an unstable condition will resolve itself by the biasing member 34 urging the system into a position of lower potential energy (i.e. a rotational position characterized by the track 25, 26 undulations properly mating with one another) wherein a chain or drive means is properly aligned with the center of a gear. The cylindrical variation of the Gear Climb 12 may be employed in a variety of embodiments as shown and described herein.

In various embodiments, derailleur sliders of the present disclosure may be actuated by hydraulic or pneumatic means, as opposed to or in combination with conventional derailleur cables. In one embodiment, hydraulics capable of push-pull actuation through one or more hydraulic hoses serves to manipulate the derailleur slider, for example. It will therefore be recognized that actuation means of the present disclosure are not limited to conventional wire cables.

In various embodiments, a derailleur slider is provided on the inside of a mated triangular housing. This arrangement allows a pull-pull controller mechanism to be used, such as the previously described Cuff Link Controller, a hydraulic two way controller, or an electric motor. The housed design allows the system to adapt to the various needs of bicycles, whether it be for downhill mountain bike racing, competitive road biking, cross country mountain biking, touring and even cruiser bikes. Derailleur sliders incorporated within the housing offer increased protection and provide for easier and longer lasting lubrication.

In various embodiments, hydraulic systems are provided within a derailleur system to manipulate or actuate a slider. For example, in various embodiments, hydraulic fluid may provide force to compress and/or expand an accordion bladder contained within the derailleur housing. FIGS. 8-15B provide various views of one embodiment of a derailleur 60 comprising a hydraulic system and an accordion bladder 66 for translating derailleur components and a drive member. A hydraulic derailleur 60 is provided in a manner such that gear transmission is effected through a "push-pull" arrangement whereby a positive pressure imparted upon and/or by a hydraulic fluid 68 actuates an accordion bladder 66 such that the bladder 66 expands and contracts and thus translates connected transmission systems. Hydraulic fluid 68 is provided in combination with a controller 64 and a transmission cable 62. The cable 62 may be provided in any number of desired lengths and arrangements to satisfy the needs and/or geometries of a specific vehicle. FIGS. 13A-14B provide cross-sectional views of the accordion bladder 66 in a contracted (FIG. 13B) and expanded state (FIG. 14B). It will be recognized that the bladder may be expanded to any number of non-discrete locations and/or positions. Gear centering features and devices as shown and described herein are provided in various embodiments to properly align a transmission system with a singular gear or cog. FIG. 15B depicts a cross-sectional view of a controller 64 and cable 62 according to one embodiment. Hydraulic fluid(s) 68 is disposed therein, the fluid 68 being operable to control a bladder 66 and associated derailleur components when a force 70 is imparted on the controller 64 in either rotational direction.

In various embodiments, derailleurs of the present invention, including triangular housing derailleurs depicted in FIG. 11 comprise electronic shifting features coupled with gear centering features of the present disclosure. For example, a servo-motor and corresponding power source is provided in communication with the derailleur to translate derailleur components along the length of the derailleur. Actuation of electronic components positions derailleur components, such as the wheel pulley assembly, to a user-determined location. Upon the likely event that such a user-determined location does not correspond with the center of a sprocket, gear centering features as shown and described herein operate to automatically position, re-position, and/or correct the position of the derailleur feature(s) to align with a sprocket and allows the system to operate efficiently. Accordingly, the present disclosure eliminates the need of an electronic transmission system to be calibrated or indexed precisely for movement between a plurality of predetermined points. While electronic derailleurs of the present disclosure may include such calibration, derailleurs of the present disclosure contemplate attaining precise and automatic alignment of a drive chain or drive member via biased gear centering features.

With reference now to FIGS. 16A-D, another example of a Gear Climb or gear centering device 1600. The Gear Climb 1600 may provide similar functions to other Gear Climbs and Gear Climb features described herein. In some embodiments, the Gear Climb 1600 corresponds to a parallelogram-type gear centering device. The Gear Climb 1600 includes a first section 1604 and a second section 1608 that are slidably interconnected with one another. More specifically, the first section 1604 may comprise a rail or track feature 1624 and the second section 1608 may comprise a corresponding rail or track feature 1620 that interfaces with the rail or track feature 1624 of the first section 1604. The first section 1604 and second section 1608 may be configured to slide or move laterally with respect to one another to facilitate the shifting from one gear to another gear.

In some embodiments, the first section 1604 comprises an interconnect 1612 and the second section 1608 comprises an interconnect 1616. The first section 1604 may also comprise a cable attachment member 1632 that enables a cable or similar component to be connected with the first section 1604. It should be appreciated that while not depicted, the cable attachment member 1632 may be provided on the second section 1608 as an alternative or in addition to having the cable attachment member 1632 on the first section 1604.

In some embodiments, the interconnects 1612, 1616 are points on the Gear Climb 1600 for connecting to other components of a derailleur. For instance, one of the interconnects 1612, 1616 may connect with or be secured to (e.g., via a screw, post, glue, welding, etc.) appropriate parts of the derailleur 1.

The cable attachment member 1632 may connect with the cable 4 that travels to the gear shifter or controller. The cable 4 connecting to the cable attachment member 1632 may be used to apply tensile forces, which in turn the second section 1608 to move relative to the first section 1604. In some embodiments, the cable 4 may pull the two sections 1604, 1608 apart, thereby making the overall length of the Gear Climb 1600 longer. Alternatively, the cable 4 may pull the two sections 1604, 1608 together, making the overall length of the Gear Climb 1600 smaller. Furthermore, biasing forces may be applied to one or both of the sections 1604, 1608 to counteract the forces applied by the cable 4.

As with the other Gear Climbs described herein, the Gear Climb 1600 may comprise one or more biasing members or a collection of features that work together to bias the relative position of the first section 1604 to the second section 1608. Specifically, a plurality of indentations, peak and valleys, ridges, notches, etc. 1628 may interact with a biased post 1624 and/or bearing 1636. As lateral forces are applied at the cable attachment member 1632, the first section 1604 moves laterally with respect to the second section 1608. If movement of the two sections 1604, 1608 causes the bearing 1636 to rest on a peak of the notches 1628, the bearing 1636, under the force of a spring connected to the post 1624 may be forced to roll to a valley of the notches 1628, thereby fixing the relative lateral positions of the sections 1604, 1608.

One particular advantage to employing the parallelogram Gear Climb 1600 is that the biasing members (e.g., notches 1628, post 1624, and/or bearing 1636) may be contained within a substantially sealed environment that is relatively free of dust, dirt, and other debris. FIGS. 17A-C show yet another alternative configuration for a Gear Climb 1700 where circular first and second sections 1704, 1708 are used. In this embodiment, the first section 1704 may correspond to a post or plunger that enters a hole or via in the larger second section 1708. This hole or via may be sealed with a plastic gasket, o-ring, or the like. The biasing members may be contained within the sealed larger second section 1708. In some embodiments, the biased post may be connected to the second section 1708 and may be pushed by a spring inwardly toward notches established on the outer circumference of the first section 1704. Alternatively, the biased post may be connect to the first section 1704 and may be pushed by a spring outwardly toward notches established on the inner wall of the second section 1708. As can be seen in FIGS. 17A-C, the Gear Climb 1700 may comprise interconnects 1712, 1716 for connecting to other parts of the derailleur 1.

FIGS. 18A-C and 19A-B depict another example of a derailleur 1800 according to embodiments of the present disclosure. Specifically, the derailleur 1800 may be provided with a Gear Climb 1812 that is operated by one or more cables 1808. The Gear Climb 1812 may correspond to any type or combination of Gear Climbs described herein. The cables 1808 may be similar or identical to the cables 4 and they may pass from a controller (e.g., on handles of the bicycle) through a cable guide 1804 on the derailleur until they are attached at the appropriate location on the Gear Climb 1812.

As can be seen in FIG. 18A, for example, the cable guide 1804 may comprise an oval, elliptical, rectangular, or non-circular shape to accommodate the two cables 1808 in a side-by-side orientation. In some embodiments, any other cable housing or cable guide provided on a bicycle may be configured to have an oval, elliptical, or non-circular shape. For example, any guide from the controller to the derailleur (front or back) which is used to carry or hold the cables 1808 may have such a non-circular shape.

FIGS. 18A-C and 19A-B also depict a single setting mechanism 1816 that can control the limits on the amount of movement allowed by the Gear Climb 1812. Specifically, prior art derailleurs provided two setting mechanisms, one to control the starting position (e.g., lower limit of relative movement) of the derailleur and one to control the ending position (e.g., the upper limit of relative movement). Because embodiments of the present disclosure enable indexing at the derailleur, it is no longer necessary to have two setting mechanisms to control the starting and ending positions. Rather, a single setting mechanism 1816 can be provided to set either the starting position or the ending position and the opposite position can be controlled by the Gear Climb 1812.

In accordance with at least some embodiments, any of the derailleurs or Gear Climb mechanisms described herein may employ one or more springs to bias movement of one or more components within the biased members. In some embodiments, the one or more springs employed in the derailleur or Gear Climb mechanism may be stronger (e.g., have a higher spring weight or apply a larger force) than any spring in a controller/shifter assembly. More specifically, embodiments of the present disclosure contemplate a derailleur or Gear Climb having one or more springs that apply a biasing force that is greater than or equal to any other total forces applied by springs in a shifter assembly and/or by the cable(s) connecting the shifter assembly with the derailleur.

With reference now to FIGS. 20A-C, a shifter assembly 2000 will be described in accordance with embodiments of the present disclosure. The shifter assembly 2000 may correspond to a grip shifter assembly that is configured to be integrated with the grips or handles of the bicycle. In some embodiments, the shifter assembly 2000 comprises an unmovable grip portion 2004 and a movable grip portion 2008. The movable grip portion 2008 may be configured to rotate or spin around the handle bars whereas the unmovable grip portion 2004 does not. The shifter assembly 2000 also comprises a cable 216 that enters the assembly housing 2012 through a cable entry 2020.

FIGS. 20B and 20C show the shifter assembly 2000 without the housing 2012. As can be seen in these figures, the cable 2016 is configured to, partially or completely, wrap around the handle. In particular, the cable 2016 interfaces with the movable grip portion 2008 at an extended radial portion 2032. The extended radial portion 2032 may be larger in diameter than the handle and, therefore, may cause the cable 2016 to move a greater distance when the movable grip portion 2008 is rotated.

The cable 2016 may correspond to a single piece of cable (e.g. an endless loop of material travelling through the derailleur and shifter assembly or one piece of material having only two ends, each of which terminate at the derailleur) or two pieces of cable (e.g., two pieces of material, each having one end that terminates at the assembly 2000 and each having one end that terminates at the derailleur). In some embodiments, the cable 2016 is secured or fastened to the extended radial portion 2032 with one or more fasteners 2028a, 2028b, 2032. In the embodiment depicted in FIG. 20B, a single fastener 2032 that can be used to secure a single piece of cable 2016 to the extended radial portion 2032. In the embodiment depicted in FIG. 20C, a first and second fastener 2028a, 2028b are used to secure first and second pieces of cable 2016 to the extended radial portion 2032. Thus, as the movable grip portion 2008 is rotated, the cable 2016 exerts a tensile force on one or more components of the derailleur and/or Gear Climb.

FIGS. 21A-C depict another variant of a shifter assembly 2100 that is similar to shifter assembly 2000 except with a lower profile. The shifter assembly 2100 again comprises a movable grip portion 2104, but the larger housing is replaced with a smaller housing. Moreover, the shifter assembly 2100 comprises a radial element 2108 that is still larger in diameter than the handles of the bicycle, but is smaller or equal in diameter to the movable grip portion 2104. In some embodiments, as with the shifter assembly 2000, the shifter assembly 2100 comprises a groove or track that receives the cable and maintains it within the radial element 2108. Additionally, the cable can be secured to the radial element 2108 in a similar fashion to that described in connection with shifter assembly 2000.

FIGS. 22A-C and 23A-B show another possible type of shifter assembly. Rather than employing a grip shifter assembly, embodiments of the present disclosure enable the use of a push-button shifter assembly 2200 to control the motion of the derailleur and/or Gear Climb. In some embodiments, the shifter assembly 2200 comprises a housing 2204 that is generally cylindrical, but with a tapered section 2206. The tapered section 2206 interfaces between the round portions of the housing 2204 and a cable entry 2210. The tapered section 2206 helps follow or conform with the natural path of the cable 2216 as it transitions between from the radial element 2304 of the shifter assembly 2200 to the cable entry 2210 of the housing 2204.

The housing 2204 also comprises an actuator guide 2212. In some embodiments, that the actuator guide 2212 directs or controls the motion of the push button actuators 2216, 2220 within the housing 2204. In the particular embodiment depicted, the actuator guide 2212 causes the actuators 2216, 2220 to travel a linear path within the housing 2204. It should be appreciated, however, that the actuator guide 2212 may facilitate non-linear movement (e.g., arcuate, circular, etc.) of the actuators 2216, 2220 within the housing 2204. Further still, it may not be necessary to use the actuator guide 2212 as the actuators 2216, 2220 may be directly attached to the radial element 2304 or a sprocket 2308 connected thereto with a cable, pulley, or the like. In such an embodiment, the pressing of the actuator 2216, 2220 may result in a movement of the radial element 2304 without the assistance of an intermediate component.

In some embodiments, the shifter assembly 2200 may comprise a first and second actuator 2216, 2220 that are configured to move the cable 2216 in a first and second rotational direction, respectively. In some embodiments, the first actuator 2216, when pushed into the housing 2204, causes a first engagement mechanism 2316 to engage a sprocket 2308 or the like that is attached to the radial element 2308. The force applied by the first engagement mechanism 2316 to the sprocket 2308 causes the sprocket 2308 to rotate the radial element 2304 in a first direction, which, in turn, pulls the cable 2216 in a first direction. Similarly, the second actuator 2220, when pushed into the housing 2204, causes a second engagement mechanism 2324 to engage the sprocket 2308. The force applied by the second engagement mechanism 2324 to the sprocket 2308 causes the sprocket 2308 to rotate the radial element 2304 in a second direction, which, in turn, pulls the cable 2216 in a second direction.

As noted above, the actuator guide 2212, in some embodiments, causes the actuators 2216, 2220 to travel a substantially linear path relative to the housing 2204 and the other components of the assembly 2200. Regardless of whether the actuators 2216, 2220 travel a linear or non-linear path, the sprocket 2308 and engagement mechanisms 2316, 2324 may be dimensioned such that the sprocket 2308 only rotates a predetermined amount if an actuator 2216, 2220 is fully pressed into the housing 2200. A biasing spring or multiple biasing springs (not shown) may also be secured to the interior of the housing 220 and may cause the actuators 2216, 2220 to return to their original resting position where the engagement mechanisms 2316, 2324 are not actually engaged with the sprocket 2308. The biasing spring(s) may connect with the actuators 2216, 2220 at or near the actuator guide 2212 or at connector arms 2312 that connect the part of the actuator 2216, 2220 that slides through the guide with the engagement mechanisms 2316, 2324.

The assembly 2200 may also comprise one or more grip connectors 2208 that enable the assembly 2200 to be mounted or secured to the handle of the bicycle. The grip connectors 2208 may utilize any type of screw or pressure fit device that allows the assembly 2200 to be removed and attached to the handles of the bicycle as desired.

Any of the embodiments of a derailleur described herein may be used in combination with any other type of bicycle feature. Certain features, however, may particularly benefit from the use of a derailleur or Gear Climb as disclosed herein. One example of such a bicycle transmission feature that may benefit from the functionality of the concepts described herein is a "Floating Front Ring", which is described in U.S. patent application Ser. No. 13/544,669, filed Jul. 9, 2012, the entire contents of which are hereby incorporated herein by reference. The Floating Front Ring, in some embodiments, provides the ability to have a sprocket or set of sprockets (e.g., front sprocket) that can freely slide horizontally in and out (e.g., substantially perpendicular to the rotational path of the sprocket) to substantially align the chain with the chosen sprocket on the rear cassette.

As one non-limiting example, a bicycle transmission system may be provided with a Floating Front Ring as well as one or more derailleurs having a Gear Climb as disclosed. More specifically, a bicycle transmission system may comprise at least a back derailleur that is capable of self-indexing. As the derailleur is shifted from one gear to another, the Floating Front Ring may slide horizontally to accommodate the newly selected gear.

Another illustrative bicycle transmission system may comprise a Floating Front Ring and one or both of the cables travelling to the rear derailleur (which may or may not have a Gear Climb device incorporated therein) may be used to help facilitate the lateral movement of the Floating Front Ring. Specifically, a cable guide may be provided that is also attached to the front sprocket or set of sprockets. As the rear derailleur is shifted from one gear to another, the lateral motion of the cable(s) may apply a force to the cable guide which is translated to the front sprocket or set of sprockets. Because the sprocket or set of sprockets is capable of floating and moving laterally in response to such a force from the cable guide, the sprocket or set of sprockets may be moved into alignment with selected rear gear. In some embodiments, if two cables travel to the rear derailleur, then one or both of those cables may be used to assist the manipulation/movement of the Floating Front Ring.

Another illustrative bicycle transmission system may utilize a front derailleur (with or without a Gear Climb device) to manipulate the Floating Front Ring. Alternatively, or in addition, a return spring can be used to facilitate the manipulation of the Floating Front Ring. Examples of derailleurs that may be used in combination with the Floating Front Ring are described in U.S. Pat. Nos. 7,341,532; 7,442,136; 7,527,571; 7,651,424; 7,666,111; 7,712,566; and 8,057,332, each of which are hereby incorporated herein by reference in their entireties.

While various portions of the present disclosure generally refer to "rear" derailleur systems or transmission systems for cassettes disposed on a rear wheel of a vehicle, it will be expressly recognized that various features as shown and described herein may be employed on various system, including "front" derailleur systems. For example, it is known that bicycles frequently include a plurality of cogs or chain rings in direct communication with a pair of crank arms to which pedals are attached, in addition to rear cogs connected to a hub of a rear wheel. Various features of transmission systems of the present disclosure may be provided to transmit a drive means from such a plurality of "front" chain rings. Known "front" derailleur systems typically comprise not more than three chain rings, making the transmission device for shifting a drive means between the front chain rings significantly less complex than "rear" systems which frequently comprise ten or more cogs. Nevertheless, features as shown and described herein are provided for simply and efficient transmission between front cogs with various improvements over the prior art.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims. Further, the disclosure(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A gear transmission system for a vehicle, said vehicle being equipped with front and rear wheels, said rear wheel being fixedly attached to a series of parallel drive sprockets driven by a drive member, comprising:
   a controller in force transmitting communication with a derailleur, said controller being located remote from said derailleur and operated directly by a user of the vehicle;
   said derailleur comprising a mount for attaching said derailleur proximate the drive sprockets of said vehicle, a shaft having first and second ends, said mount fixedly supporting said shaft at an angle substantially parallel to an angle created by said series of parallel drive sprockets, and at least one pulley wheel assembly translatable along said shaft in response to a force transmitted by said controller;
   a gear centering device for biasing said pulley wheel and said drive means toward a position characterized by said drive member being aligned with one of said drive sprockets;
   said gear centering device comprising a plurality of tapered features defining a plurality of positions characterized by said drive member being aligned with one of said drive sprockets, and at least one biased member for biasing said pulley wheel assembly toward one of said plurality of positions.

2. The gear transmission system of claim 1, wherein the gear centering device is disposed within said shaft.

3. The gear transmission system of claim 1, wherein the gear centering device is disposed within a second shaft substantially parallel to said shaft.

4. The gear transmission system of claim 1, wherein movement of said pulley wheel assembly and said drive member is induced by a looped cable or cables that travel in a loop between the derailleur and the controller, wherein the controller is positioned on a handlebar of a bicycle.

5. The gear transmission system of claim 1, wherein said drive member comprises a roller chain.

6. The gear transmission system of claim 1, wherein said at least one biased member for biasing said gear centering device comprises a biased tapered pin interconnected to said derailleur and translatable along said plurality of tapered features.

7. The gear transmission system of claim 1, wherein said derailleur comprises a slider assembly interconnected with said pulley wheel assembly and wherein said slider assembly comprises a biased pin member for communicating with said plurality of tapered features.

8. The gear transmission system of claim 7, wherein each of said plurality of tapered features comprise points of reduced system potential energy providing for geometrical alignment of said pulley wheel assembly and a gear when said pin member is disposed in one of said points of reduced system potential energy.

9. An apparatus for positioning a device in a plurality of predetermined positions, comprising:
- a first rotatable member having a plurality of first radially-disposed surface features and a plurality of second radially-disposed surface features;
- a second member biased toward the first member;
- the plurality of first radially-disposed surface features defining points of dimensional instability for the second member and the plurality of second radially-disposed surface features defining points of dimensional stability for the second member; and
- the second member provided in fixed force transmitting communication with the translatable device.

10. The apparatus of claim 9, wherein the translatable device comprises a derailleur comprising a pulley wheel assembly for guiding a drive chain.

11. The apparatus of claim 9, wherein the plurality of predetermined positions comprise a plurality of positions aligned with a like number of stacked cogs.

12. The apparatus of claim 9, wherein the plurality of first radially-disposed surface features and the plurality of second radially-disposed surface features are adjacent features spaced at substantially even intervals.

13. The apparatus of claim 9, wherein the plurality of first radially-disposed surface features and the plurality of second radially-disposed surface features comprise adjacent features arranged about a center point of rotation of the first rotatable member.

14. The apparatus of claim 9, wherein the second member comprises a spring biased pin member having a tapered end.

15. A gear transmission system for a vehicle, said vehicle being equipped with front and rear wheels, said rear wheel being fixedly attached to a series of parallel drive sprockets driven by a drive member, comprising:
- a controller in force transmitting communication with a derailleur, said controller being located remote from said derailleur;
- said derailleur comprising a mount for attaching said derailleur proximate the drive sprockets of said vehicle, said mount fixedly supporting at least a portion of said derailleur at an angle substantially parallel to an angle created by said series of parallel drive sprockets, and at least one pulley wheel assembly translatable in response to a force transmitted by said controller;
- a gear centering device comprising a plurality of tapered features defining a plurality of stable and unstable positions, and a biased tapered pin interconnected to said derailleur translatable along said plurality of tapered features and biased toward a proximate stable position, said gear centering device and the components thereof being contained within a substantially sealed environment.

16. A gear transmission system for a vehicle, said vehicle being equipped with front and rear wheels, said rear wheel being fixedly attached to a series of parallel drive sprockets driven by a drive member, comprising:
- a controller in force transmitting communication with a derailleur, said controller being located remote from said derailleur;
- said derailleur comprising a mount for attaching said derailleur proximate the drive sprockets of said vehicle, a shaft having first and second ends, said mount fixedly supporting said shaft at an angle substantially parallel to an angle created by said series of parallel drive sprockets, and at least one pulley wheel assembly translatable along said shaft in response to a force transmitted by said controller;
- a gear centering device for biasing said pulley wheel and said drive means toward a position characterized by said drive member being aligned with one of said drive sprockets;
- said gear centering device comprising a plurality of tapered features defining a plurality of positions characterized by said drive member being aligned with one of said drive sprockets, and at least one biased member for biasing said pulley wheel assembly toward one of said plurality of positions, wherein said controller, during shifting, causes forces to be exerted on the gear centering device that cause the plurality of tapered features to move relative to the at least one biased member and wherein said controller, when not being shifted, does not exert any forces on the gear centering device, thereby resulting in the at least one biased member being the only force-exerting component on the plurality of tapered features.

* * * * *